United States Patent [19]

Tachikawa et al.

[11] Patent Number: 5,031,225
[45] Date of Patent: Jul. 9, 1991

[54] CHARACTER RECOGNITION METHOD FOR RECOGNIZING CHARACTER IN AN ARBITRARY ROTATION POSITION

[75] Inventors: Michiyoshi Tachikawa; Masayuki Ishigami, both of Tokyo; Hiroyoshi Ishizaki, Yokohama; Hiroshi Nakayama, Tokyo, all of Japan

[73] Assignee: Ricoh Company, Ltd., Japan

[21] Appl. No.: 281,728

[22] Filed: Dec. 9, 1988

[30] Foreign Application Priority Data

Dec. 9, 1987 [JP] Japan ................................ 62-311533
Dec. 16, 1987 [JP] Japan ................................ 62-318098
Nov. 12, 1988 [JP] Japan ................................ 63-286579

[51] Int. Cl.$^5$ .............................................. G06K 9/48
[52] U.S. Cl. .................................... 382/21; 382/9; 382/22; 382/23; 382/46
[58] Field of Search .................... 382/21, 22, 23, 9, 10, 382/46, 48

[56] References Cited

U.S. PATENT DOCUMENTS 4,015,239  3/1977  Fujimoto et al. ................ 382/46
4,903,312  2/1990  Sato ................................ 382/9
4,929,085  5/1990  Kajihara .......................... 382/46

Primary Examiner—David K. Moore
Assistant Examiner—Jose L. Couso
Attorney, Agent, or Firm—Mason, Fenwick & Lawrence

[57] ABSTRACT

A character recognition method includes reading a document having characters displayed thereon and entering a document data representative of the content of the document. Image data of one of the characters from the document data is extracted. The one character has an orientation rotated by an arbitrary rotation angle from a predefined reference position for the one character. A first feature quantity of the one character is extracted from the extracted image data. The extracted feature quantity is converted into a second feature quantity of the one character in the reference position based on the arbitrary rotation angle. A dictionary which contains stored feature quantities of a plurality of characters in the reference position is interrogated so as to find a primary candidate character which has a feature quantity matching or most closely resembling the converted feature quantity.

30 Claims, 20 Drawing Sheets

| DIRECTION CODE | 1 | 2 | 3 | 4 | 5 | 6 | 7 | 8 |
|---|---|---|---|---|---|---|---|---|
| NO. OF DIRECTION CODES | 14 | 7 | 7 | 7 | 14 | 7 | 7 | 7 |

| DIRECTION CODE BEFORE CONVERSION | 1 | 2 | 3 | 4 | 5 | 6 | 7 | 8 |
|---|---|---|---|---|---|---|---|---|
| DIRECTION CODE AFTER CONVERSION | 7 | 8 | 1 | 2 | 3 | 4 | 5 | 6 |

| DIRECTION CODE | 1 | 2 | 3 | 4 | 5 | 6 | 7 | 8 |
|---|---|---|---|---|---|---|---|---|
| NO. OF DIRECTION CODE | 7 | 7 | 14 | 7 | 7 | 7 | 14 | 7 |

FIG.6A
FIG.6B
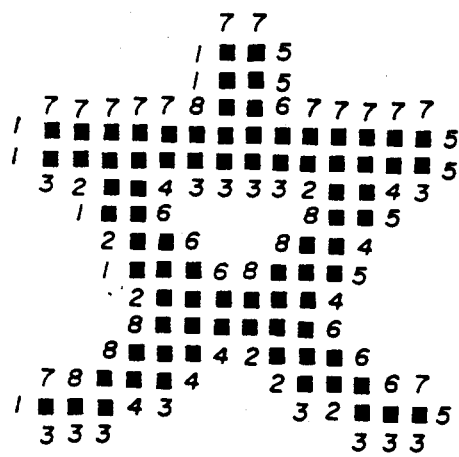
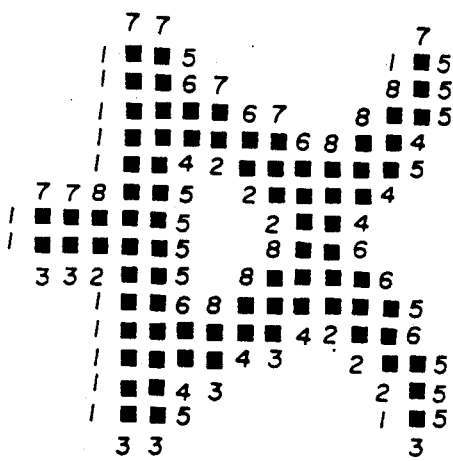
FIG.6C
FIG.6D
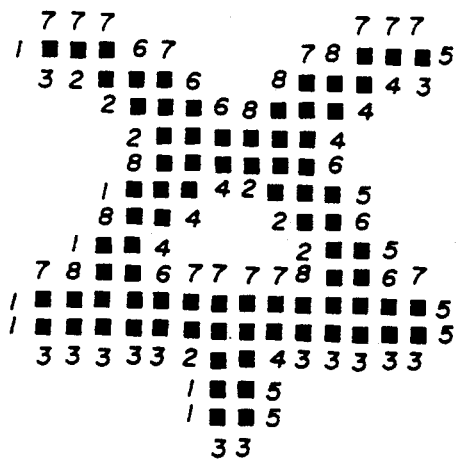
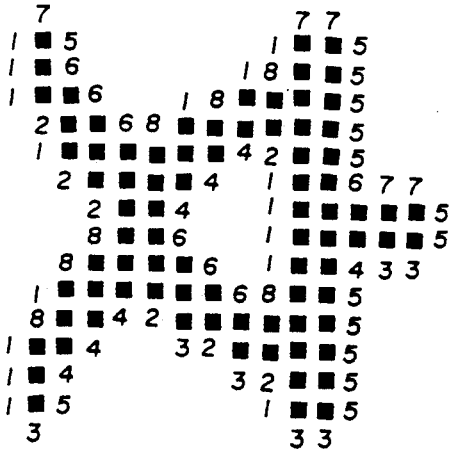

| REGION NO. | | 1 | | | | | | | | 2 | | | | | | |
|---|---|---|---|---|---|---|---|---|---|---|---|---|---|---|---|---|
| DIRECTION CODE | 1 | 2 | 3 | 4 | 5 | 6 | 7 | 8 | 1 | 2 | 3 | 4 | 5 | 6 | 7 | 8 |
| NO. OF DIRECTION CODES | 3 | 0 | 0 | 0 | 0 | 0 | 1 | 0 | 0 | 0 | 0 | 0 | 1 | 2 | 2 | 0 |

| | 3 | | | | | | | | 4 | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| | 0 | 0 | 0 | 0 | 0 | 1 | 1 | 0 | 0 | 0 | 3 | 0 | 3 | 0 | 1 | 1 |

| | 15 | | | | | | | | 16 | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| | 0 | 1 | 1 | 0 | 0 | 0 | 0 | 0 | 1 | 1 | 0 | 3 | 0 | 0 | 0 | 0 |

FIG. 12B

| REGION BEFORE CONVERSION | 1 | 2 | 3 | 4 | 5 | 6 | 7 | 8 | 9 | 10 | --- | 14 | 15 | 16 |
|---|---|---|---|---|---|---|---|---|---|---|---|---|---|---|
| REGION AFTER CONVERSION | 4 | 8 | 12 | 16 | 3 | 7 | 11 | 15 | 2 | 6 | --- | 5 | 9 | 13 |

FIG.12C

| REGION NO. | 1 | | | | | | | | 2 | | | | | | | |
|---|---|---|---|---|---|---|---|---|---|---|---|---|---|---|---|---|
| DIRECTION CODE | 1 | 2 | 3 | 4 | 5 | 6 | 7 | 8 | 1 | 2 | 3 | 4 | 5 | 6 | 7 | 8 |
| NO. OF DIRECTION CODES | 1 | 0 | 0 | 0 | 0 | 0 | 3 | 0 | 2 | 0 | 0 | 0 | 0 | 0 | 3 | 1 |

| | 3 | | | | | | | | 4 | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| | 0 | 0 | 0 | 0 | 2 | 0 | 3 | 0 | 2 | 0 | 0 | 0 | 1 | 0 | 3 | 0 |

| | 15 | | | | | | | | 16 | | | | | | | |
|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 |
| | 0 | 2 | 1 | 0 | 0 | 0 | 0 | 0 | 0 | 0 | 3 | 0 | 1 | 1 | 1 | 0 |

CHARACTER RECOGNITION METHOD FOR RECOGNIZING CHARACTER IN AN ARBITRARY ROTATION POSITION

BACKGROUND OF THE INVENTION

The present invention generally relates to character recognition methods, and more particularly to a character recognition method for recognizing a character even when the character is rotated by an arbitrary angle from a regular position.

In the present specification, the regular position or orientation of a character refers to a customary upright position of the character so that it can be read in a normal manner.

Generally, when recognizing a character, a document image is scanned and the character recognition is made with respect to each row of characters extracted from the scanned document image. For example, in the case of Japanese characters, the characters may be written from the left to right of a document 1A as shown in FIG. 1A or may be written from the top to botton of a document 1B as shown in FIG. 1B. In the case of FIG. 1B, each character is rotated 90 degrees counterclockwise compared to the corresponding character in FIG. 1A. The extracted characters may be rotated by an angle other than 90 degrees from the regular position, such as 0, 90, 180 and 270 degrees.

In other words, the document image which is scanned may contain a portion written along one direction and another portion written along another direction. FIG. 2 shows such a document 2 wherein the characters are written from the left to right and top to bottom in a portion 2a and the characters are written from the bottom to top and left to right in a portion 2b. Furthermore, a skew orientation may be generated when the document image is scanned in a state where the document is not correctly positioned, whereby the characters in the document image are rotated by a certain angle with reference to a pr determined regular position of the characters.

Conventionally, a dictionary which is used when recognizing the scanned character contains features for recognizing characters in the regular position by comparing a feature extracted from the scanned character with the features contained in the dictionary. For this reason, when the scanned character is not in the predefined regular position and is rotated by an angle from that regular position, it is impossible to recognize the scanned character by use of the dictionary, because the dictionary does not contain features of characters in positions rotated from the regular position.

Therefore, it is conceivable to provide a plurality of dictionaries and store in each dictionary the features of the characters in a position rotated by a predetermined angle from the regular position. For example, when the scanned character is rotated by 90 degrees from the regular position, the character recognition can be accomplished by use of a dictionary which contains the features of characters rotated by 90 degrees from the predefined regular position. However, in this case, a dictionary for each possible rotation angle of the characters from the regular position must be provided, and there is a problem in that a large number of dictionaries must be provided for the same characters but having different rotation angles from the regular position. As a result, an extremely large memory capacity is required by the dictionaries, this rendering this method impractical.

On the other hand, it is also contemplated that the scanned character can be rotated back to the predefined regular position before extracting the feature. In other words, when first image data is obtained by scanning the character which is not in the regular position, the first image data is subjected to a rotation process so as to obtain second image data which is representative of the character oriented in the regular position. Then, the feature of the second image data is extracted and character recognition is made by use of the dictionary which contains the features of the characters in regular predefined positions. In this case, it is unnecessary to provide a plurality of dictionaries for the same characters. However, the rotation process needed to convert the first image data into the second image data is very complex, and there is a further problem in that the speed of character recognition is significantly reduced because the rotation process takes a considerable time.

SUMMARY OF THE INVENTION

Accordingly, it is a general object of the present invention to provide a novel and useful character recognition method in which the problems described above are eliminated.

Another and more specific object of the present invention is to provide a character recognition method in which a first feature quantity extracted from a scanned character is converted into a second feature quantity depending on the rotation angle of the character when compared with a reference position, corresponding to the customary orientation of the character. Character recognition is made by use of the second feature quantity and a dictionary which contains feature quantities of characters in the reference position. According to the character recognition method of the present invention, there is no need to provide a plurality of dictionaries for the same characters, and there is no need to subject an image data of the scanned character to a complex and time consuming rotation process. Therefore, the character recognition can be made with respect to characters in any rotation position by use of a single dictionary at a satisfactory character recognition speed.

Still another object of the present invention is to provide a character recognition method in which the rotation angle of the predefined character from the reference position is determined automatically. According to the character recognition method of the present invention, the is no need to manually set the rotation angle of the character from the reference position when character. Hence, it is possible to carry out character recognition with high efficiency for documents in which the characters are not necessarily aligned in a certain direction.

Other objects and further features of the present invention will be apparent from the following detailed description when read in conjunction with the accompanying drawings

BRIEF DESCRIPTION OF THE DRAWINGS

FIGS. 6A through 6D show character patterns of the same character at different rotation positions together with the assigned direction codes for explaining a first embodiment of a character recognition method according to the present invention;

FIG. 10A shows divided regions of a character pattern and region numbers assigned thereto;

FIGS. 10B and 10C respectively show the character patterns for the same character described in conjunction with FIGS. 6A and 6B in correspondence with the divided regions shown in FIG. 10A;

FIGS. 12A through 12C respectively show relationships of the region numbers, the direction codes and numbers thereof before the conversion, a relationship of the region numbers before and after the conversion; and the relationships of the region numbers, the direction codes and numbers thereof after the conversion;

DETAILED DESCRIPTION OF THE PREFERRED EMBODIMENTS

Figures 1A, 1B:
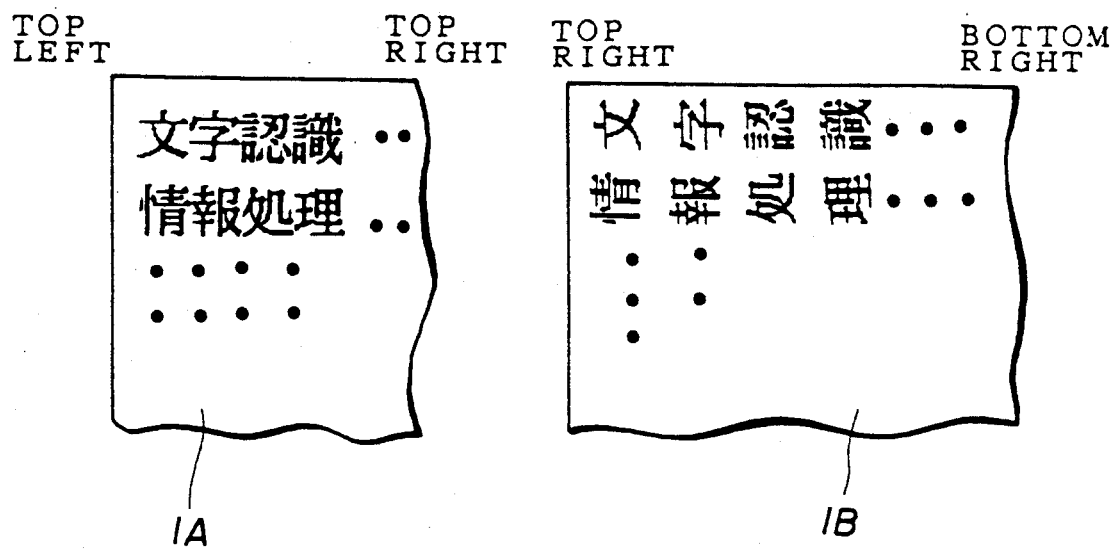
FIGS. 1A and 1B respectively show document images in which characters are written along certain directions.
Figure 2:
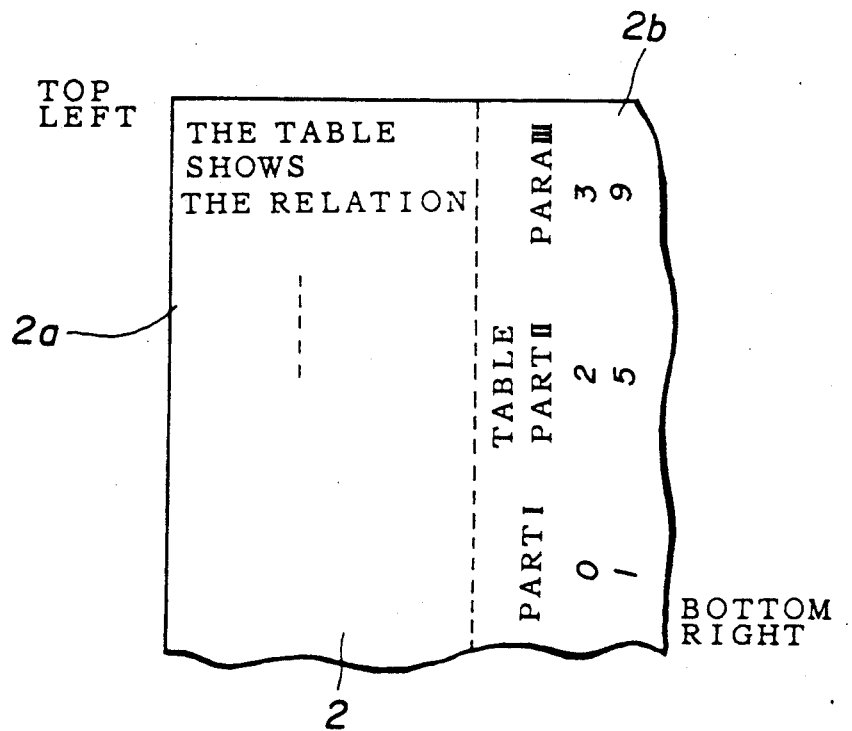
FIG. 2 shows a document image having portions in which the characters are written along mutually different directions.
Figure 3:
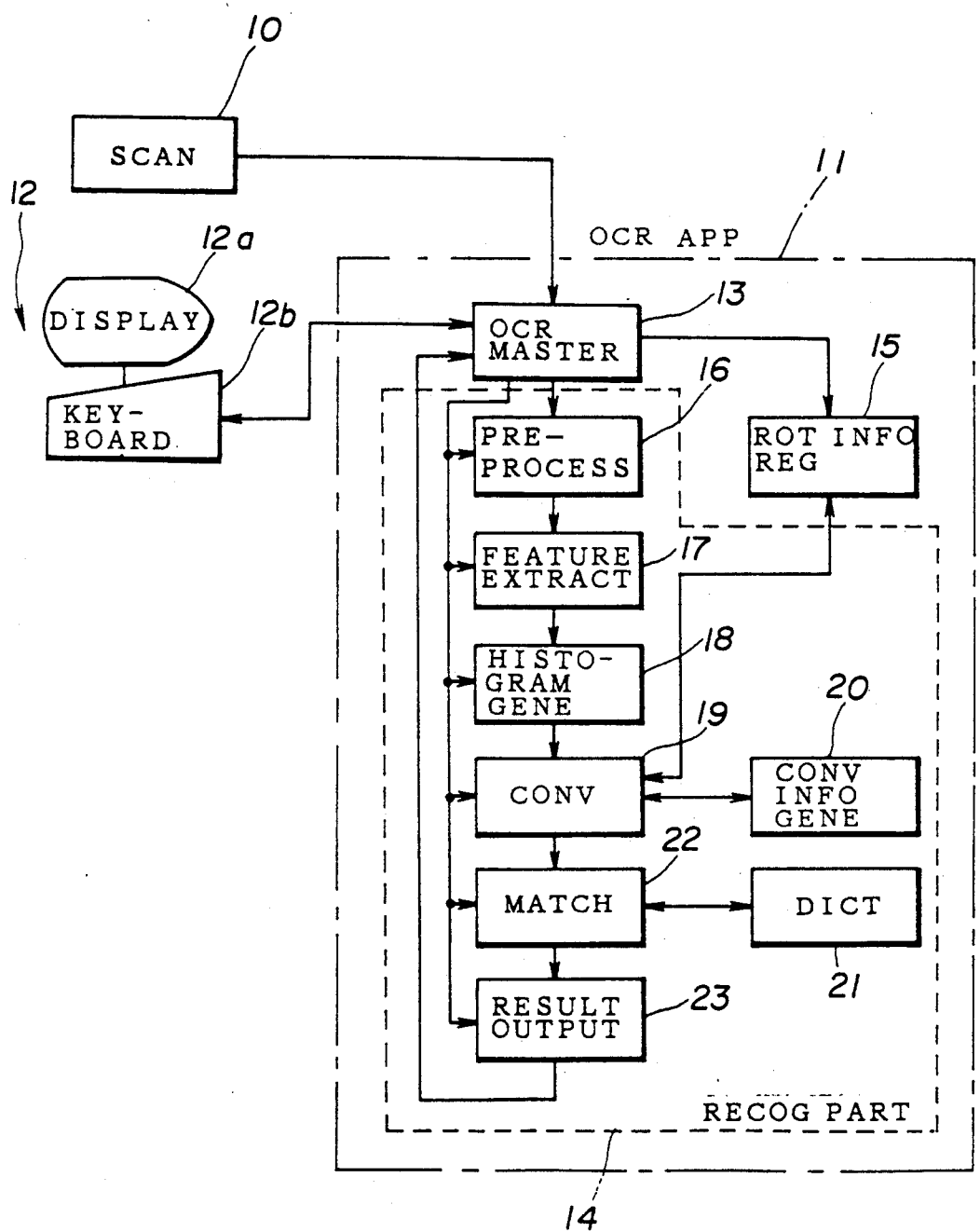
FIG. 3 is a functional block diagram showing a character recognition apparatus for explains embodiments of a character recognition method employ the teachings of the present invention.

FIG. 3 shows a character recognition apparatus for explaining embodiments of the character recognition method according to the present invention. The character recognition apparatus has a scanner 10, an optical character recognition (OCR) apparatus 11 indicated by a one-dot chain line, and an OCR controller 12 made up of a display unit 12a and a keyboard 12b. The OCR apparatus 11 has an OCR master 13, a recognition part 14 indicated by a phantom line, and a rotation information register 15. The recognition part 14 has a pre-processor 16, a feature extraction part 17, a histogram generator 18, a conversion part 19, a conversion information generating part 20, a dictionary 21, a matching part 22, and a result output part 23.

The OCR controller 12 controls the operation of the OCR apparatus 11 through the OCR master 13 which functions as an interface and a controller. The rotation information register 15 stores rotation information on the rotation angle of a character which is designated by the OCR controller 12.

Binary image information representative of a document scanned by the scanner 10 is supplied to the OCR apparatus 11 through the OCR master 13, and the preprocessor part 16 carries out pre-processing including extraction of a character from the binary image information and normalization of image data related to the extracted character. The feature extractor 17 extracts a feature quantity from the image data of the extracted character, and the histogram 18 generates a histogram of the extracted feature quantity. The conversion part 19 converts the representative into a histogram of the same character in the regular position or orientation depending on the rotation information from the rotation information register 15 by use of corresponding conversion information generated from the conversion information generator 20. The matching part 22 compares the histogram of the character in its regular position with histograms of characters stored in the dictionary 21 so as to find a matching histogram and recognize the character. The result of the character recognition is outputted from the result output part 23 and supplied to the OCR master 13.

The conversion information generator 20 may be in the form of either of a look-up table or an operation circuit. In the case of a look-up table, the conversion information is calculated in advance for various rotation angles of the character and prestored in a table, so that the required conversion information may be read out from the look-up table by use of the rotation information obtained from the rotation information register 15. On the other hand, in the case of the operation circuit, the conversion information is calculated every time character recognition is made based on the rotation information obtained from the rotation information register 15.

In addition, the histogram generator 18, the conversion part 19 and the conversion information generator 20 may be integrated so as to extract the feature quantity and generate the histogram simultaneously such as when the conversion is carried out depending on the rotation information from the rotation information register 15.

Figure 4:
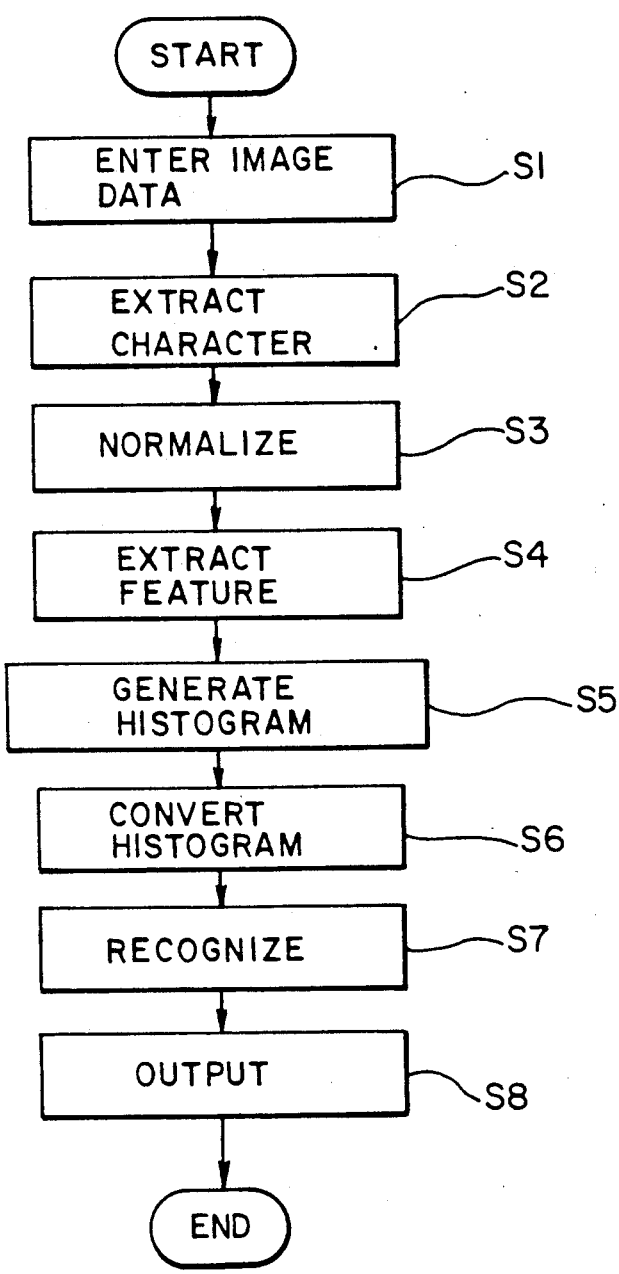
FIG. 4 is a flow chart for explaining an operating of the OCR master for the character recognition apparatus shown in FIG. 3.
Figures 5, 8A, 8B, 8C:
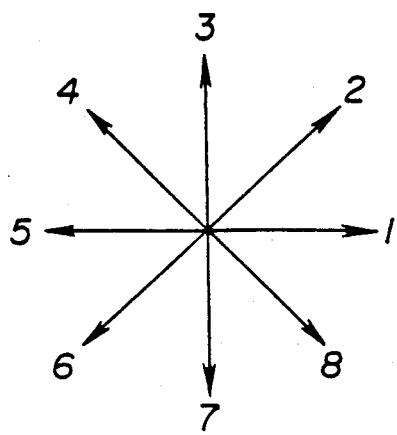
FIG. 5 is a diagram for explaining what is meant a direction code.
FIGS. 8A through 8C respectively show the relationship of the direction codes and numbers thereof before the conversion, the relationship of the direction codes before and after the conversion, and the relationship of the direction codes and numbers thereof after the conversion.

FIG. 4 is a flow chart of control steps for explaining the operation of the OCR master 13. Initially image data is entered from the scanner 10 (step (S1). During step S2 a character from the image data, and a step S3 the image data is extracted of the extracted character is normalized by controlling the pre-processor 16. Next, the feature of the character is extracted by controlling the feature extractor 17, and during step S5, a histogram of direction codes assigned to a character pattern of the extracted character (feature) is generated . During step S6 converts (rotates) the histogram into a histogram is converted (related) of direction codes of the same character pattern as found in a regular orientation for the character based on the rotation information obtained from the rotation information register 15, by controlling the conversion part 19 and the rotation information generator 20. Step S7 recognizes the extracted character by comparing the converted (rotated) histogram with the histograms stored in the dictionary 21 and finds a matching histogram, by controlling the matching part 22. Finally, during step S8 the result of the character recognition are output by controlling the result output part 23.

next, a description will be given of a first embodiment of the character recognition method according to the present invention. In this embodiment, the feature extractor 17 extracts the feature of the character and assigns a direction code to contour picture elements collectively representative of a character pattern, and the histogram generator 18 generates a histogram of the direction codes as the feature quantity. The contour picture elements define the shape of the character being scanned. The direction code indicates the direction in which the picture elements constituting the character pattern extend, and the direction code is numbered "1" to "8" as shown in FIG. 5 depending on the direction in which the picture elements extend.

FIGS.6A, 6B, 6C and 6D respectively show the character patterns of a certain Chinese character (kanji) together with the assigned direction codes at a regular position or customary orientation (that is, a position rotated 0 degree from the regular position), a position rotated 90 degrees counterclockwise from the regular position, a position rotated 180 degrees from the regular position and a position rotated 270 counterclockwise from the regular position. The certain Chinese character is taken as an example of the extracted character because this character includes all eight kinds of direction codes shown in FIG. 5. In FIGS.6A through 6D, the black rectangular marks indicate picture elements constituting the character pattern.

For example, when FIGS.6A and 6B are compared, it may be seen that the picture element assigned with the direction code "1" in FIG. 6B is assigned with the direction code "7" in FIG. 6A, the picture element assigned with the direction code "2" in FIG. 6B is assigned with the direction code "8" in FIG. 6A, and the picture element assigned with the direction code "1" in FIG. 6A. Hence, it is found that the picture element assigned with a direction code x in the character pattern rotated 90 degrees counterclockwise from the regular position is assigned with a direction code x+6 in the character pattern in the regular position, except the picture element is assigned with a direction code (x+6)−8 in the character pattern in the regular position when x+6 is greater than 8. This conversion of the direction code to obtain the direction code of the same character in the regular position may be described by the following formula (1), where d denotes the direction code before the conversion, c denotes a constant dependent on the rotation angle of the character pattern from the regular position (that is, the rotation information), and D denotes the direction code after the conversion. In this case, the constant c is 0, 6, 4 and 2 when the counterclockwise rotation angles from the regular position respectively are 0, 90, 180 and 270 degrees.

$$D = MOD(d+c-1, 8)+1 \qquad (1)$$

The formula (1) is applied when the direction codes shown in FIG. 5 are used to obtain the histogram of the extracted feature. However, a similar formula may be applied when direction codes other than those shown in FIG. 5 are used.

The histogram of the direction codes outputted from the histogram generator 18 is a histogram of the direction codes before the conversion described above. On the other hand, the dictionary 21 stores histograms of the direction codes with respect to characters in the regular position. Hence, in the case where the extracted character pattern is rotated 90 degrees counterclockwise from the regular position, the conversion part 19 converts the histogram of the direction codes obtained from the histogram generator part 18 into a histogram of the direction codes of the same character pattern in the regular position by use of the formula (1).

In the case where the conversion information generator 20 is implemented through by a look-up table, histograms of the direction codes of characters rotated by certain rotation angles from the regular position are calculated in advance using the formula (1) and pre-stored in the conversion information generator 20 in the form of a table. Since the rotation information register 15 stores the rotation angle of the character designated from the OCR controller 12, the conversion part 19 can look up the table of the conversion information generator 20 and read out the histogram of the direction codes of the same character in the regular position. In other words, the conversion part 19 converts the histogram of the direction codes of the character pattern rotated 90 degrees counterclockwise from the regular position into the histogram of the direction codes of the same character pattern in the regular position. This conversion carried out in the conversion part 19 is essentially a rearranging of the direction code components of the histogram depending on the rotation angle of the character pattern from the regular position.

The matching part 22 compares the histogram after the conversion with the histograms stored in the dictionary 21 and finds a primary candidate character (that is, a matching or closely resembling histogram) as the result of the recognition. This primary candidate character is supplied to the OCR master 13 through the result output part 23, and the character recognition with respect to one character is ended. Hence, the character recognition of a next character is started through the OCR master 13.

Figure 7:
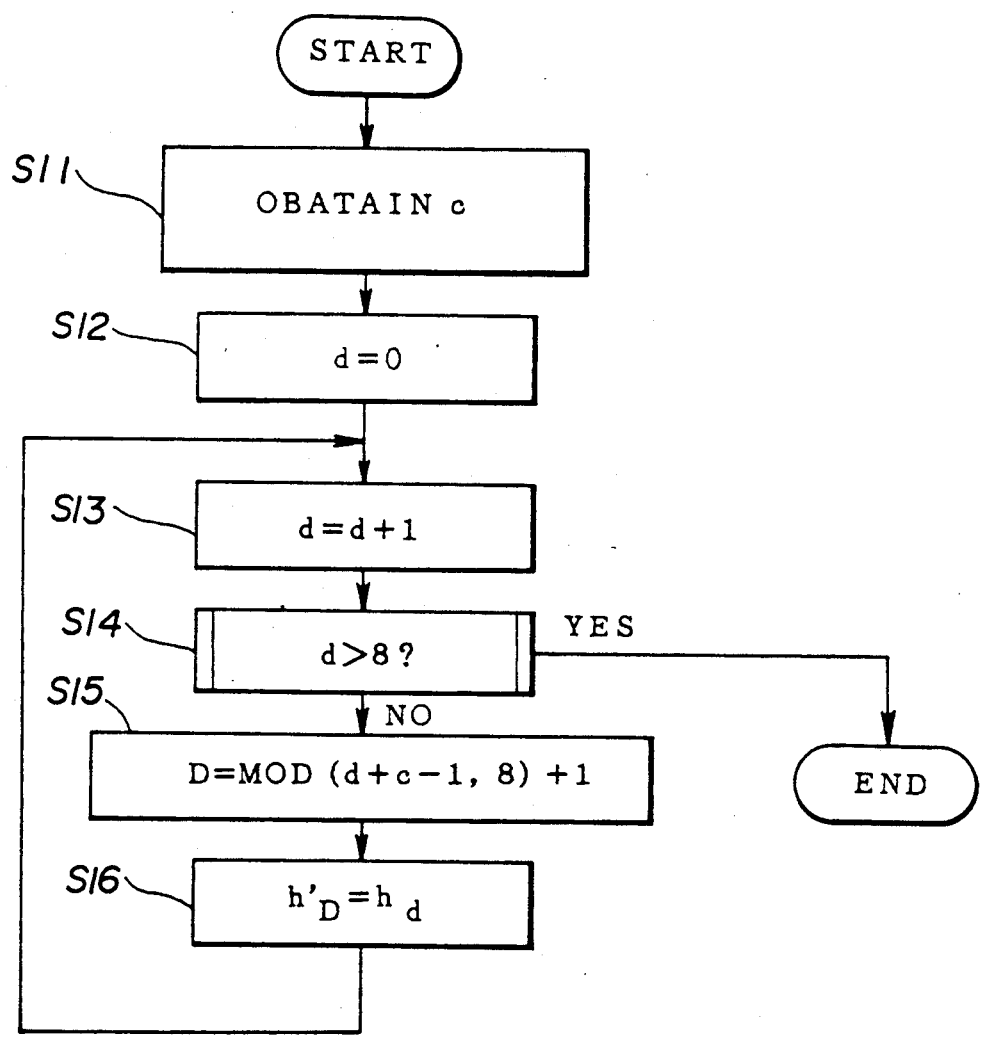
FIG. 7 is a flow chart of explaining the operation of the conversion part of the character recognition apparatus in the first embodiment.

FIG. 7 shows a flow chart for an operation carried out by the conversion part 19 in the first embodiment under the control of the OCR master 13. Initially during step S11 obtains the rotation information (constant) c is obtained from the rotation information register 15, and than during a step S12, the direction code d is set to "0". Next, at step S13, the direction code d inxewmwnra by one, and a step S14 discerns whether or not the direction code d is greater than "8". The process is ended when the result obtained in step S14 is YES. On the other hand, when the discrimination result in the step S14 is NO, a step S15 carries out an operation described by the formula (1). Then, during step S16, a rotated histogram (that is, the histogram after the conversion) h'$_D$ set to h$_d$ and the process returns to the step S13. Here, h$_1$ denotes the number of direction codes "1", h$_2$ denotes the number of direction codes "2", ..., and h$_8$ denotes the number of direction codes "8", and a feature quantity H is made up of h$_1$ through h$_8$.

FIG. 8A shows the relationship of the direction codes and the number of direction codes extracted from the histogram h$_d$ for the character pattern shown in FIG. 6B before the conversion, and FIG. 8B shows the relationship of the direction codes before and after the conversion. FIG. 8C shows the relationship of the direction codes and the number of direction codes extracted from the histogram of the character pattern shown in FIG. 6A, that is, the number of direction codes extracted from the rotated histogram h'$_D$ after the conversion. In other words, the relationship shown in FIG. 8A is obtained, and the direction codes are converted as shown in FIG. 8B before arriving at the final relationship shown in FIG. 8C.

The histogram generator 18, the conversion part 19 and the conversion information generator 20 may be integrated so as to extract the feature quantity and generate the histogram simultaneously as when the conversion is carried out depending on the rotation information from the rotation information register 15. This is essentially equivalent to botyaining the relationship shown in FIG. 8c from FIG. 8A without having to obtain the intermediate relationship shown in FIG. 8B.

Figure 9A:
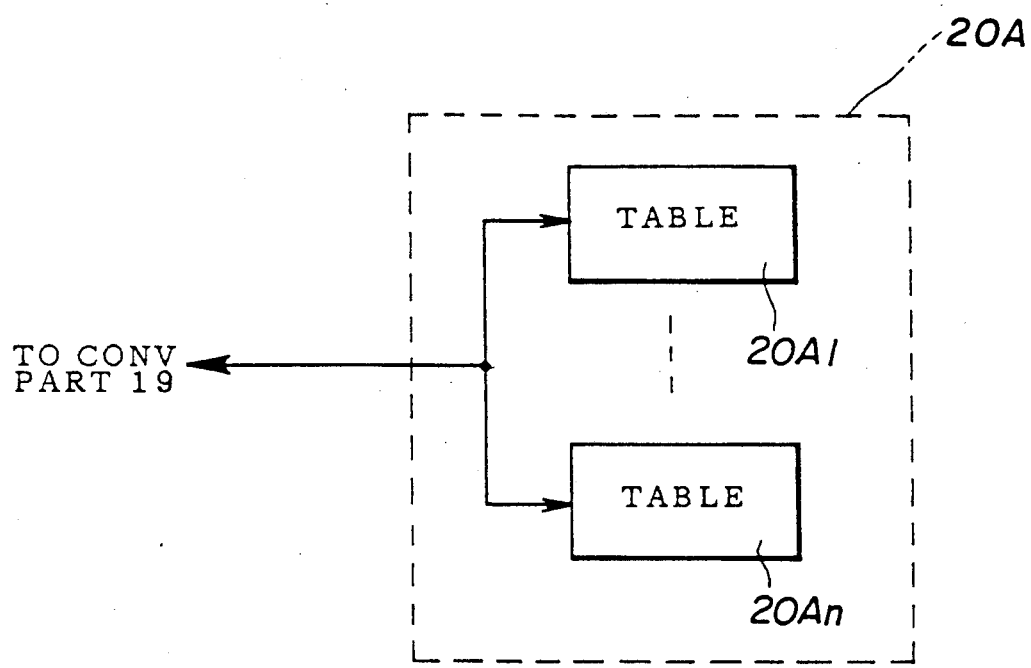
FIGS. 9A and 9B each show embodiments of a conversion information generating part of the character recognition apparatus.
Figure 9B:
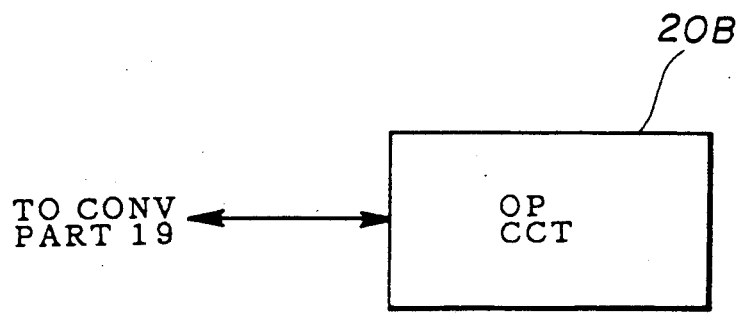

The convention information generator 20 may include a look-up table in the form shown in FIG. 9A or an operation circuit shown in FIG. 9B. In the case of a look-up table 20A shown in FIG. 9A, the conversion information is calculated in advance in conformance with the formula (1) for various rotation angles of the character and prestored in corresponding tables 20A1 through 20An, so that the required conversion information may read out from one of the tables 20A1 through 20An based on the rotation information obtained from the rotation information register 15. On the other hand, in the case of an operation circuit 20B shown in FIG. 9B, the conversion information is calculated every time the character recognition is made in conformance with the formula (1) based on the rotation informat the rotation information register 15.

Next, a description will be given of a second embodiment of the character recognition method according to the present invention According to this embodiment, the feature extraction part 17 assigns the direction codes to the contour picture elements of the character pattern in a manner similiar to the first embodiment, but in the second embodiment, the character pattern is divided into a plurality of adjacent regions arranged in an array and a histogram of the direction codes is obtained for each of the divided regions. For convenience sake, it will be assumed that the character pattern is divided into 16 adjacent regions arranged in a 4×4 array.

The assigning of the direction codes and the dividing of the character pattern into the divided regions are further disclosed in the U.S. Pat. application Ser. No. 915,285 filed Oct. 3, 1986, the disclosure of which is hereby incorporated by reference.

Figures 10A, 10B, 10C:
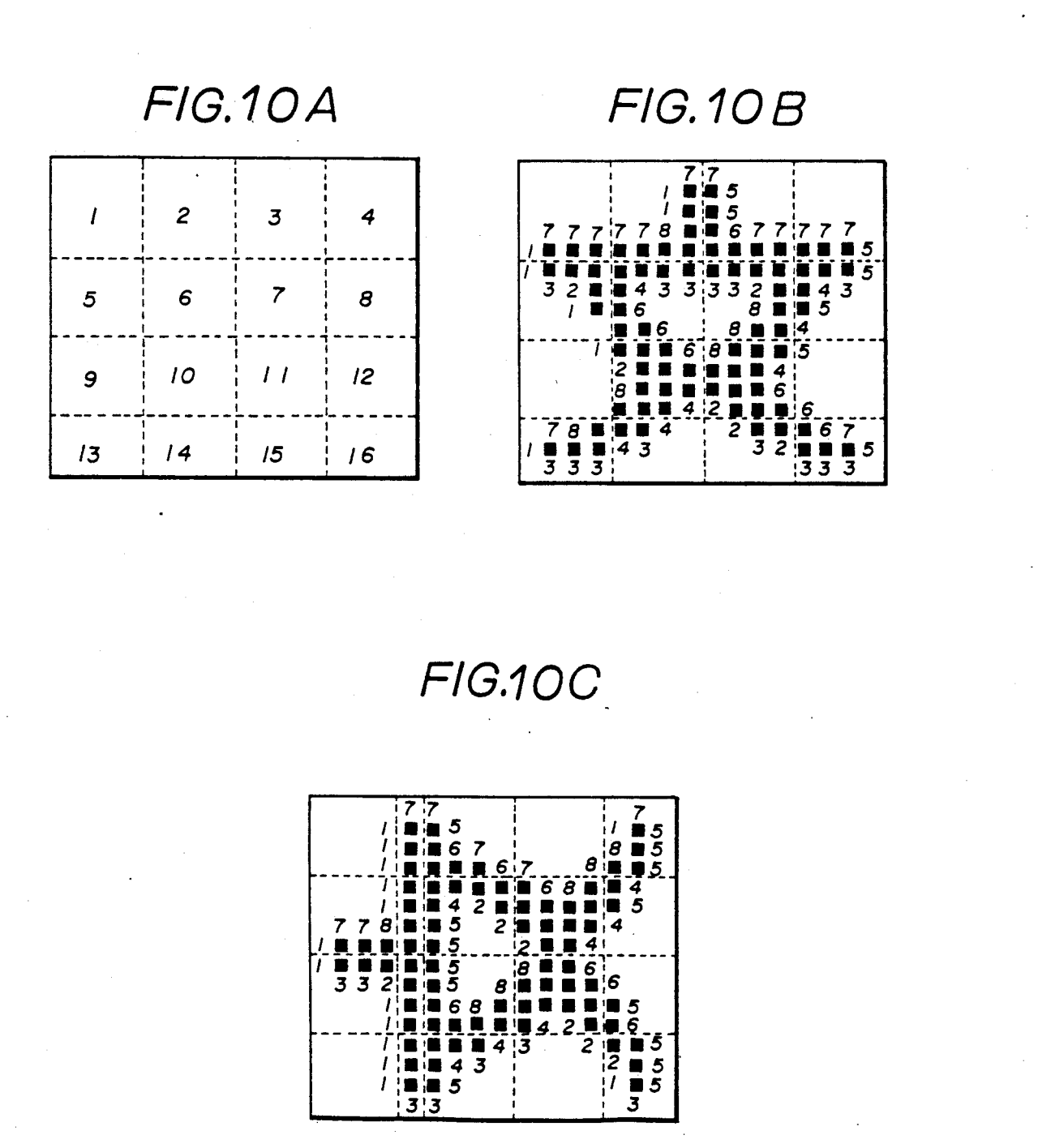

FIG. 10A shows the 16 divided regions of the character pattern and region numbers assigned thereto. FIGS.10B and 10C respectively show the character patterns of the same Chinese character described before in conjunction with FIGS.6A and 6B. FIG. 10B shows the character pattern and the assigned direction codes when the character is in the regular position and corresponds to FIG. 6A. FIG. 10C shows the character pattern and the assigned direction codes when the character is rotated 90 counterclockwise from the regular position and corresponds to FIG. 6B.

When FIGS.10B and 10C are compared, the regions "1" and "2" of the character pattern shown in FIG. 10C respectively correspond to the regions "4" and "8" of the character pattern shown in FIG. 10B. In general, a region number N of the character pattern in the regular position corresponding to a region number n of the character pattern rotated 90 degrees counterclockwise from the regular position can be described by the following formula (2). In addition, the direction code D of the character pattern in the regular position corresponding to the direction code d of the character pattern rotated 90 degrees counterclockwise from the regular position can be described by the formula (1) described before.

$$N = 4 \times ]3 - MOD(n-1, 4)[ + (n-1)/4 + 1 \qquad (2)$$

When the rotation angle of the extracted character is designated by the OCR controller 12 as being 90 degrees, this rotation information is stored in the rotation information register 15. Hence, when the conversion part 19 carries out the conversion, the required conversion information is obtained from the conversion information generator 20 has in the first embodiment described before and a histogram h$_{nd}$ of the direction codes d of the region n of the character pattern rotated 90 degrees counterclockwise from the regular position is converted into a histogram h'$_{ND}$ of the direction codes D of the region N of the character pattern in the regular position. The conversion part 19 rearranges the sequence of the region numbers and rearranges the direction codes for each region of the character pattern so as o output a histogram in which the direction codes d are converter into the direction codes D of the character pattern in the regular position. Accordingly, in this embodiment, the conversion information generator 20 generates in addition to the conversion information on the direction codes conversion information on the region numbers which are respectively calculated based on the formulas (1) and (2). The character recognition in the matching part 22 and the outputting of the result of the character recognition from the result output part 23 are carried out in the same as in the case of the first embodiment, when the conversion information generator part 20 may be implemented by the look-up table 20A shown in FIG. 9A or the operation circuit 20B shown in FIG. 9B.

Therefore, this second embodiment also carries out the conversion of the histogram of the direction codes of the character pattern which is rotated from the regular position into the histogram of the direction codes of the character pattern in the regular position. The difference from the first embodiment is that the second embodiment processes the direction codes in the divided regions. Furthermore, the conversion in this second embodiment may also be made simultaneously as the extraction of the feature of the character, as described before in conjunction with the first embodiment.

Figure 11:
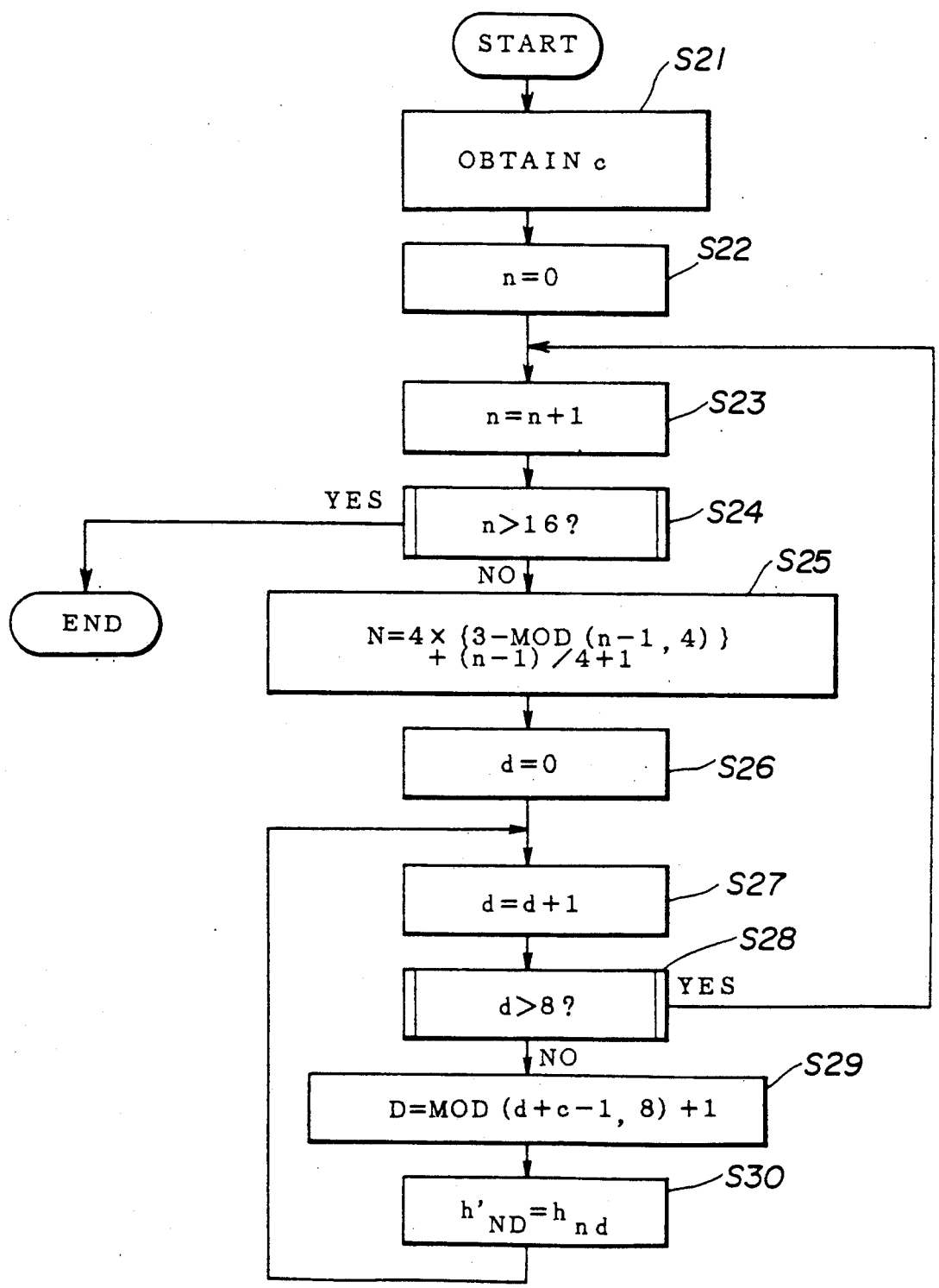
FIG. 11 is a flow chart for explaining the operation of the conversion part of the character recognition apparatus in a second embodiment of the character recognition method according to the teachings of the present invention.

FIG. 11 shows a flow chart of an operation carried out by the conversion part 19 in the second embodiment under the control of the OCR master 13. step S21, obtains the rotation information (constant) c is obtained from the rotation information register 15, and step the region number n is set to "0" (step S22). At step S23, is incremented the region number n by one, and step S24 discriminates whether or not the region number n is greater than "16". The process is ended when the discrimination result in step S24 is YES. On the other hand, when the discrimination result in the step S24 is NO, step S25 solves formula (2). Next, step S26 sets the direction code d to "0". Step S27 increments the direction code d by one, and step S28 discriminates whether or not the direction code d is greater than "8". The process returns to step S23 when the discrimination result in step S14 is YES. On the other hand, when the discrimination result in step S28 is NO, step S29 solves formula (1). Then, step S30 sets a rotated histogram (that is, the histogram after the conversion) $h'_{ND}$ to $h_{nd}$ and the process returns to step S27.

FIG. 12A shows the relationships of the region numbers, the direction codes and the number of direction codes extracted from the histogram of the character pattern shown in FIG. 10C before the conversion, and FIG. 12B shows the relationship of the region numbers before and after the conversion. FIG. 12C shows the relationships of the region numbers, the direction codes and the number of direction codes extracted from the histogram of the character pattern shown in FIG. 10B, that is, the number of direction codes extracted from the rotated histogram after the conversion. In other words, the relationships shown in FIG. 12A are obtained, and the region numbers are converted as shown in FIG. 12B before obtaining the final relationships shown in FIG. 12C.

Next, third embodiment of the character recognition method according to the present invention will be described. According to this embodiment, the feature extraction part 17 assigns the direction codes to the contour picture elements of the character pattern in conformance with an m degree peripheral pattern (a multi-layer directionality code histogram method).

The assigning of the direction codes (or directionality code) to the picture elements and the use of the m degree peripheral pattern are further disclosed in the U.S. Pat. application Ser. No. 069,303 filed July 2, 1987, the disclosure of which is hereby incorporated by reference.

According to the m degree peripheral pattern method, the character pattern is scanned from each side of the frame of the character pattern to a confronting side of the frame, so as to detect the direction code which appears next to the white (background). For example, the direction code detected first along the scanning line is classified as a first direction code, and the direction code detected second is classified as a second direction code. The frame is divided into a plurality of regions, and a histogram of the direction codes is obtained to a certain degree of the direction code with respect to each of the divided regions. A vector having the histogram values as components thereof is used as a feature vector describing the feature of the character pattern.

In other words, when the frame is divided into four regions, for example, distances to the contour picture elements along the scanning direction are calculated for each region, so as to describe the character pattern in terms of such distances. The calculated distances are referred to as a peripheral pattern describing the feature of the character pattern. Hence, the distance to the first contour picture element along the scanning direction in each region constitutes the first peripheral pattern, and the distance to the second detected contour picture element along the scanning direction in each region constitutes a second peripheral pattern.

Therefore, according to this third embodiment, the conversion of the histogram depending on the rotation angle of the character can basically be carried out in a similar manner to the second embodiment. In other words, the conversion part 19 converts the histogram of the direction codes of the character having a certain rotated position from the regular position into the histogram of the direction codes of the same character in the regular position by use of the conversion information obtained from the conversion information generator 20 and rearranges the direction code components of the converted (rotated) histogram. Of course, the dictionary 21 in this case stores the histograms of the direction codes of the characters obtained by use of the m degree peripheral pattern. The recognition in the matching part 22 and the outputting of the result of the recognition from the result output part 23 are carried out in a similar manner as in the case of the first and second embodiments.

Figure 13:
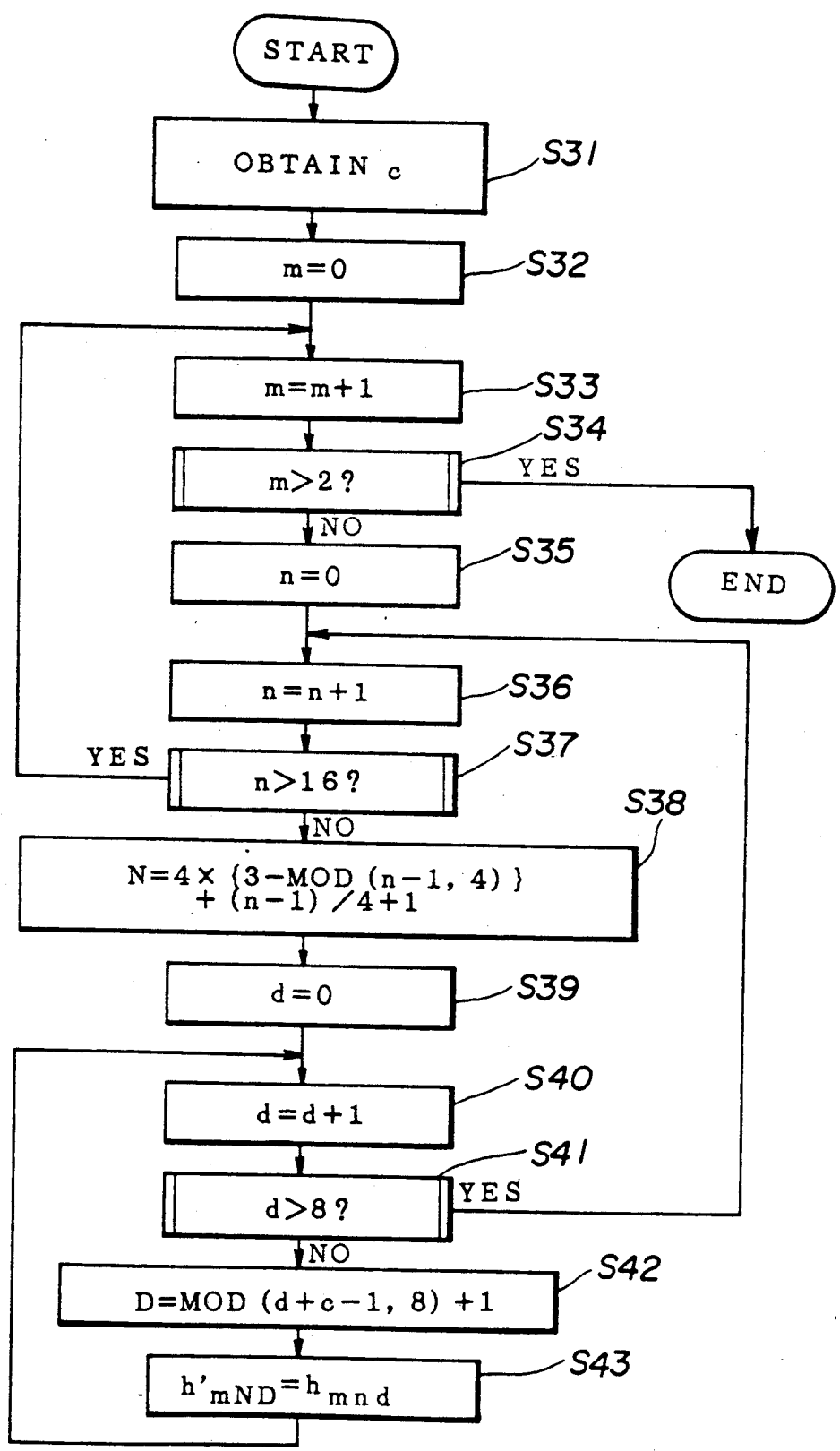
FIG. 13 is a flow chart for explaining the operation of the conversion part of the character recognition apparatus in a third embodiment of the character recognition method according to the present invention.

FIG. 13 shows a flow chart of an operation carried out by the conversion part 19 in the third embodiment under the control of the OCR master 13. Initially, at step S31, obtains the rotation information (constant) c is obtained from the rotation information register 15, and at step S32, the degree m of the peripheral pattern to "0". A step S33 increments the degree m by one, and step S34 determines whether or not the greater than "2". The process is ended when the discrimination result in step S34 is YES. On the other hand, when the discrimination result in step S34 is NO, a step S35 sets the region number n to "0". Step S36 increments the region number n by one, and step S37 discriminates whether or not the region number n is greater than "16". The process returns to the step S33 when the discrimination result in step S37 is YES. On the other hand, when the discrimination result in the step S37 is NO, step S38 solves formula (2). Next, step S39 sets the direction code d to "0". Step S40 increments the direction code d by one, and step S41 discriminates whether or not the direction code d is greater than "8". The process returns to step S36 when the discrimination result in step S41 is YES. On the other hand, when the discrimination result in step S41 is NO, step S42 carries out formula (1). Then, step S43 sets a rotated histogram (that is, the histogram after the conversion) $h'_{mND}$ to $h_{mnd}$ and the process returns to step S40.

As in the case of the first and second embodiments, the conversion information generator 20 may be implemented through the look-up table 20A shown in FIG. 9A or the operation circuit 20B shown in FIG. 9B. Furthermore, the conversion in this third embodiment may also be made simultaneously as the extraction of the feature of the character, as described before in conjunction with the first and second embodiments.

Next, a description will be given of a fourth embodiment of the character recognition method according to the present invention. According to this embodiment, the feature extractor 17 assigns the direction codes to the contour picture elements of the character pattern in conformance with a modified m degree peripheral pattern (or modified multi-layer directionality code histogram method). According to the modified m degree peripheral pattern, the histogram is obtained in conformance with the m degree peripheral pattern and the direction code components of the histogram is thereafter rearranged depending on the size of the variance or standard deviation, that is, rearranged from the direction code component having the largest variance or standard deviation. Hence, when carrying out the recognition, the comparison is made from the direction code component having the largest variance or standard deviation.

For example, the modified m degree peripheral pattern is disclosed in Japanese Laid-Open Patent Applications No.63-778 and No.63-780.

Therefore according to this fourth embodiment, the conversion fot he histogram depending on the rotation angle of the character can basically be carried out in a similar manner to the third embodiment. In other words, the conversion part 19 converts the histogram of the direction codes of the character having a certain rotated position from the regular position into the histogram of the direction codes of the same character in the regular position by use of the conversion information obtained from the conversion information generator 20 and rearranges the direction code components of the rotated histogram depending of the size of the variance or standard deviation. Of course, the dictionary 21 in this case stores the histograms of the direction codes of the characters obtained by use of the modified m degree peripheral pattern. Accordingly, in this embodiment, the conversion information generator 20 generates in addition to the conversion information on the direction codes and the conversion information on the region numbers which are respectively calculated based on the formulas (1) and (2) conversion information on the variance or standard deviation. The character recognition in the matching part 22 and the outputting of the result of the character recognition from the result output part 23 are carried out in a similar manner as in the case of the third embodiment.

Figure 14:
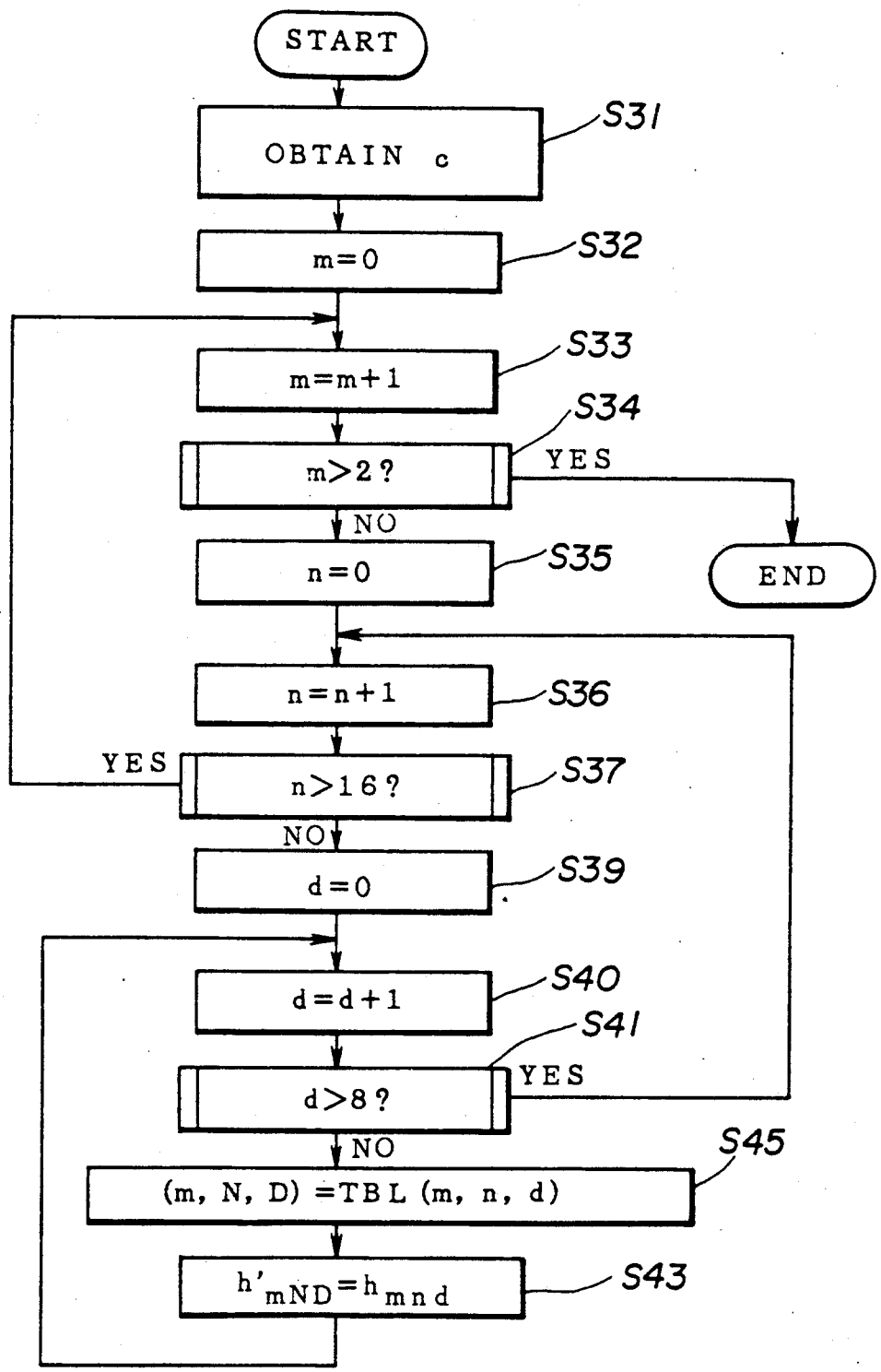
FIG. 14 is a flow chart for explaining the operation of the conversion part of the character recognition apparatus in a fourth embodiment of the character recognition method according to the present invention.

FIG. 14 shows a flow chart of an operation carried out by the conversion part 19 in the fourth embodiment under the control of the OCR master 13. In FIG. 14, those steps which are the same as those corresponding steps in FIG. 13 are designated by the same reference numerals, and a description thereof will be omitted. In FIG. 14, step S45 is provided in place of step S42 shown in FIG. 13, and the step S38 shown in FIG. 13 is omitted. Step S45 carries out a conversion operation described by the following formula (3).

$$(m, N, D) = TBL(m, n, d) \quad (3)$$

As in the case of the first and second embodiments, the conversion information generator 20 may be either the look-up table 20A shown in FIG. 9A or the operation circuit 20B shown in FIG. 9B. In addition, the histogram generator 18, the conversion part 19 and the conversion information generator 20 may be integrated so as to extract the feature quantity and generate the histogram simultaneously as when the conversion is carried out depending on the rotation information from the rotation information register 15.

The method of extracting the feature of the character is not limited to those described in the embodiments already described, and the character recognition method according to the present invention may be applied to cases where other methods of extracting the feature of the character are used.

In addition, it is possible to carry out the conversion of the feature quantities stored in the dictionary 21 instead of converting the feature quantity extracted from the character. However, it requires a complex and time consuming process to convert the feature quantities stored in the dictionary 21 every time a character recognition is made, and this is impractical.

In the first through fourth embodiments already described, the rotation information is set into the rotation information register 15 from the OCR controller 12 when the user enters the rotation information from the keyboard 12b of the OCR controller 12. In other words, the rotation information is set manually. Next, descriptions will be given of further embodiments of the character recognition method according to the present invention in which the rotation angle of the character from the regular position is automatically detected and set into the rotation information register 15.

Figure 15A:
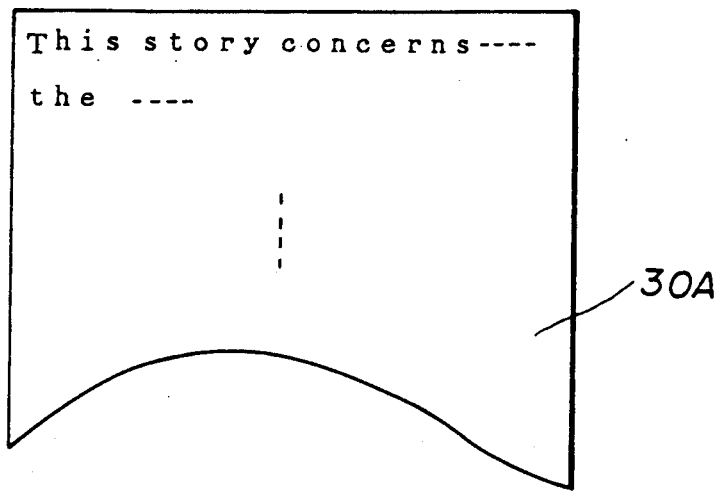
FIGS. 15A and 15B show document images aligned in mutually different directions.
Figure 15B:
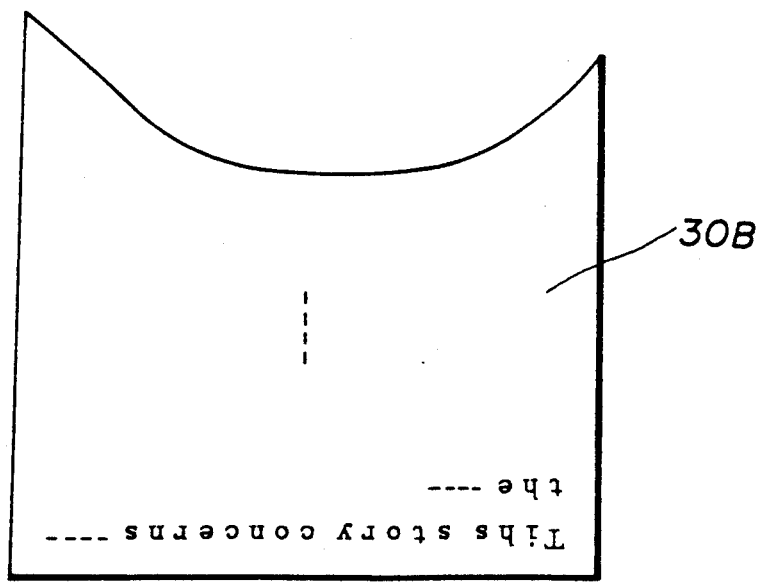

When setting a plurality of documents to be read on the character recognition apparatus, the documents may be set with the document images aligned in mutually different directions. In other words, when a document image 30A shown in FIG. 15A is set in the regular or correct position, another document 30B shown in FIG. 15B may be set upsidedown relative to the regular position. In this case, when the character extracted from the document image 30A is in the regular position, the character extracted from the document image 30B is rotated 180 degrees from the regular position. The character extracted from the document may be rotated by an angle other than 180 degrees from the regular position, such as 90 degrees counterclockwise from the regular position and 270 counterclockwise from the regular position. Further, the rotation angle need not necessarily be a multiple of 90 degrees from the regular position.

In the embodiments described hereunder, there is provided a means for detecting a rotation angle of a character from a regular position thereof, so that the detected rotation angle (rotation information) may be automatically set to the rotation information register of the character recognition apparatus.

Figure 16:
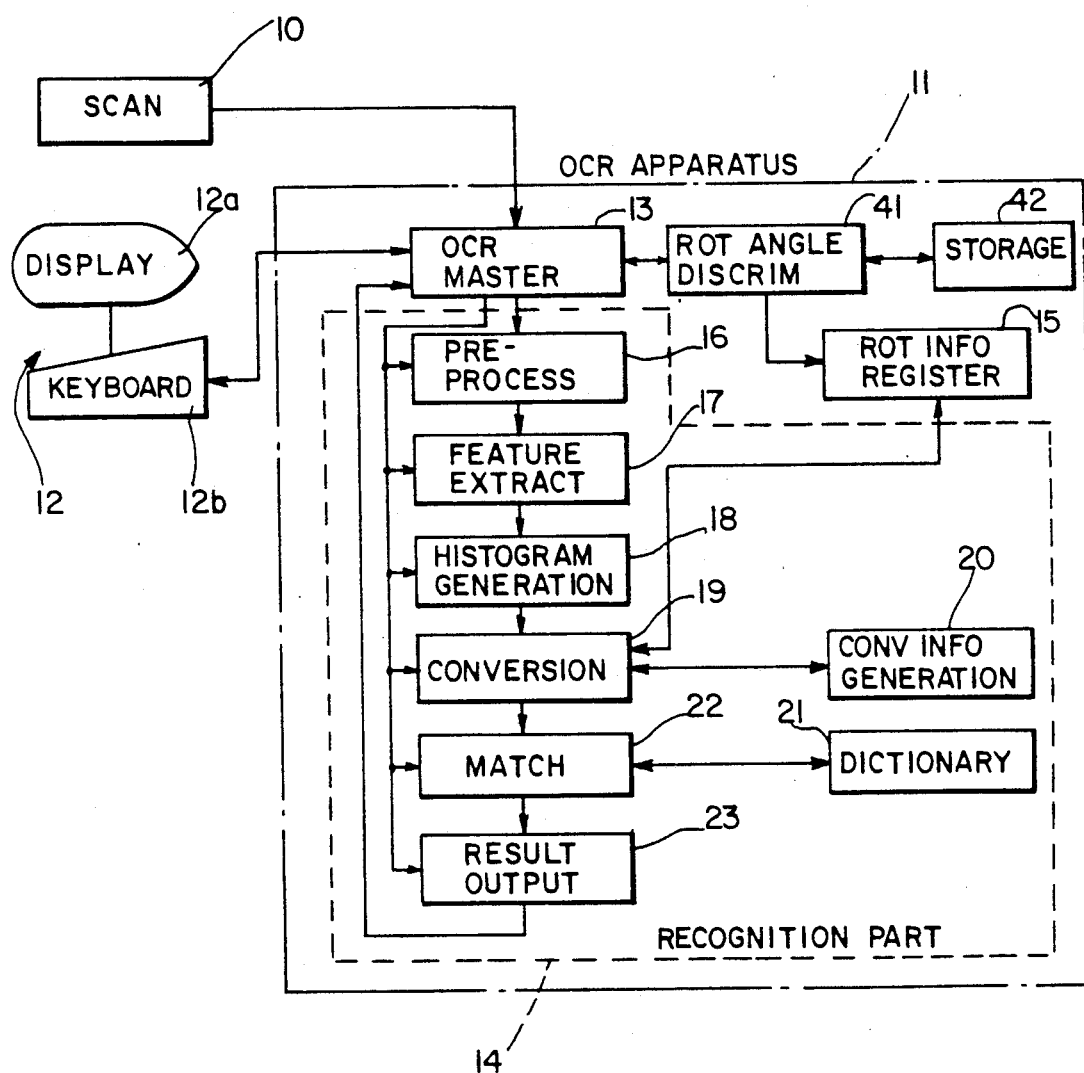
FIG. 16 is a functional block diagram showing a character recognition apparatus for explaining further embodiments of a character recognition method according to the present invention.

FIG. 16 shows a character recognition apparatus for explaining further embodiments of a character recognition method according to the present invention. In FIG. 16, those parts which are essentially the same as corresponding parts in FIG. 3 are designated by the same reference numerals, and a description thereof is omitted. In the block diagram of FIG. 16, there is provided a rotation angle discriminator 41 and a storage device 42.

A description will now be given of a fifth embodiment of the character recognition method according to the present invention. In this embodiment, the storage device 42 may be omitted. The rotation angle discriminating part 41 successively sets in the rotation information register 15 rotation angles to which the recognition part 14 is prepared to deal with. For example, it is first assumed that the rotation angle of the character is 90 degrees counterclockwise from the regular position by setting the 90 degree rotation angle in the rotation information register 15. Hence, the OCR apparatus 11 operates in conformance with any selected one of the first through fourth embodiments described before, and a first candidate character obtained as a result of the recognition is supplied to the OCR master 13 from the result output part 23. The rotation angle discriminator 41 stores a first recognition distance between the actual character stored in the dictionary 21 and the first candidate character together with the rotation angle which is 90 degrees counterclockwise from the regular position in this case. The recognition distance between the actual character and the candidate character refers to the difference between the features of the actual character and the candidate character.

Thereafter, the rotation angle of 180 degrees from the regular position is set in the rotation information register 15. Hence, the OCR apparatus 11 operates in conformance with one of the first through fourth embodiments selected above, and a second candidate character obtained as a result of the recognition is supplied to the OCR master 13 from the result output part 23. The rotation angle discriminator 41 stores a second recognition distance between the actual character and the second candidate character together with the rotation angle which is 180 degrees from the regular position in this case. A similar operation is carried out for the rotation angle of 270 degrees counterclockwise from the regular position, and a third recognition distance between the actual character and a third candidate character is stored in the rotation angle discriminator 41 together with the rotation angle which is 270 degrees counterclockwise from the regular position in this case.

Then, the rotation angle discriminator 31 decides which one of the first through third recognition distances is the smallest. The smaller the recognition distance is between the actual character and the candidate character, the greater the probability is that the candidate character is the actual character. Accordingly, the rotation angle discriminator 41 determines that that the actual rotation angle of the character from the regular position is a predetermined rotation angle stored in correspondence with the smallest recognition distance between the actual character and the candidate character, and the predetermined rotation angle is set in the rotation information register 15 as the actual rotation angle of the character.

The operation of discriminating the rotation angle of the character from the regular position may be carried out for a predetermined number of characters, a predetermined number of lines of characters, or the entire document image in order to improve the reliability of the discrimination. When discriminating the rotation angle for the predetermined number of characters, it is more efficient to store in the rotation angle discriminator 41 a first sum of the first recognition distances obtained for the predetermined number of characters with respect to the rotation angle of 90 degrees counterclockwise from the regular position, a second sum of the second recognition distances obtained for the predetermined number of characters with respect to the rotation angle of 180 degrees from the regular position, and a third sum of the third recognition distances obtained for the predetermined number of characters with respect to the rotation angle of 270 degrees counterclockwise from the regular position. In this case, a smallest one of the first through third sums is detected and the corresponding rotation angle is discriminated as being the actual rotation angle of the character from the regular position. The operation is similar to the above when discriminating the rotation angle of the character for predetermined number of lines and an entire document image.

After the discrimination of the rotation angle of the character is completed, the recognition part 14 may carry out character recognition based on the rotation information set in the rotation information register 15 by the rotation angle discriminator 41 and supply the result of the character recognition to the OCR controller 12 through the OCR master 13. On the other hand, the candidate character obtained with the discriminated rotation angle may be stored in the OCR master 13 or the rotation angle discriminator 41 and supplied to the OCR controller 12.

Figure 17:
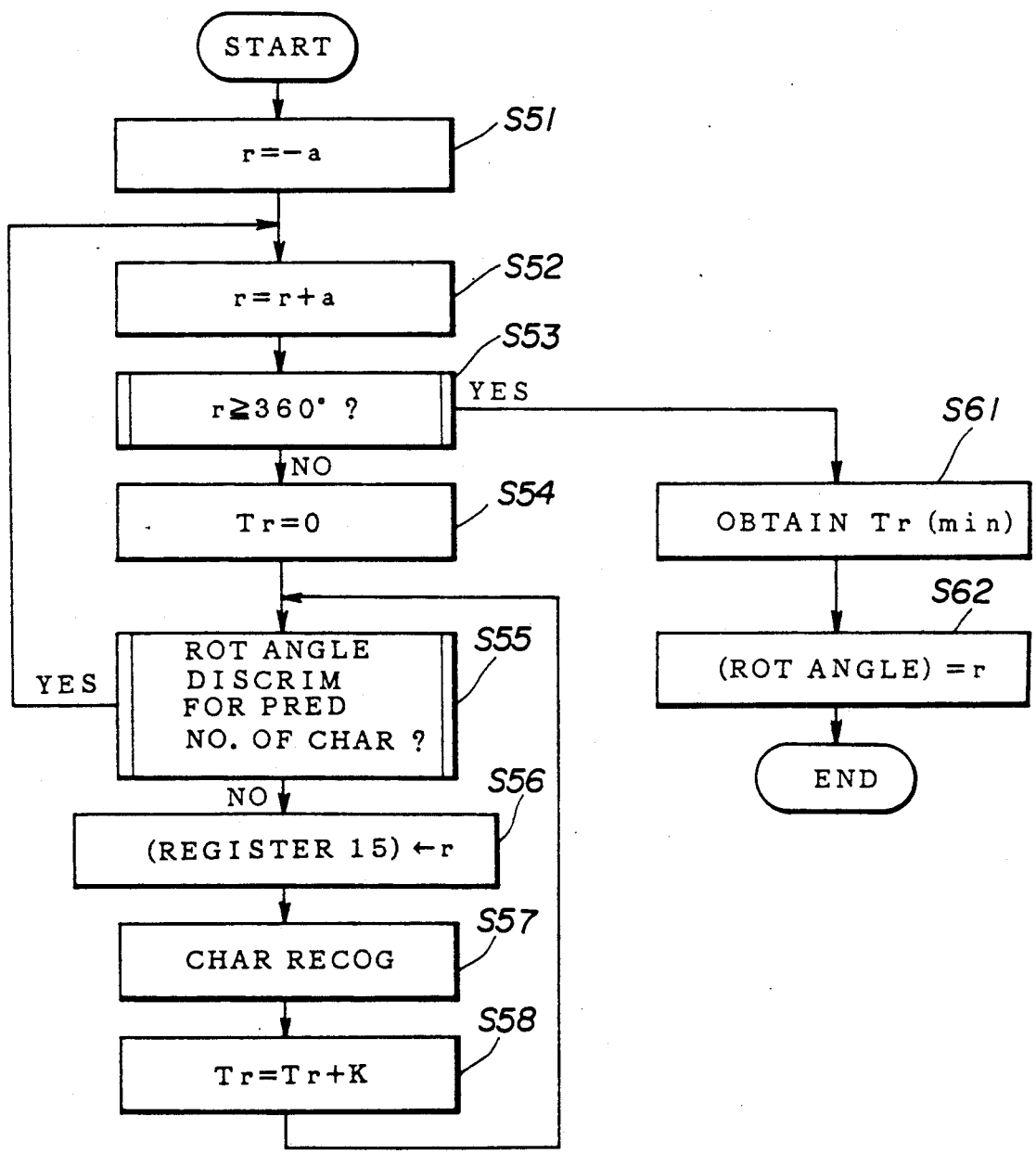
FIG. 17 is a flow chart for explaining the operation of the rotation angle discriminating part of the character recognition apparatus shown in FIG. 16 in a fifth embodiment of the character recognition method according to the present invention.

FIG. 17 shows a flow chart of an operation of the rotation angle discriminator 41 of the character recognition apparatus shown in FIG. 16 in the fifth embodiment of the character recognition method according to the present invention. Step S51 sets a rotation angle r to -a. Step S52 adds an arbitrary angle a to the rotation angle r, and a step S53 discriminates whether or not the rotation angle r is greater than or equal to 360 degrees. In the description above, the arbitrary angle a was assumed to be 90 degrees for convenience sake, but the angle a is of course not limited to 90 degrees.

When the discrimination result in step S53 is NO, step S54 sets a recognition distance Tr to "0", and step S55 determines whether or not the discrimination of the rotation angle has been completed for a predetermined number of characters. The process returns to step S52 when the discrimination result in step S55 is YES. But when the discrimination result in step S55 is NO, step S56 sets the rotation angle r in the rotation information register 15, and step S57 carries out the character recognition. Step S58 adds to the recognition distance Tr a distance K between the actual character stored in the dictionary 21 and a primary candidate character obtained by the character recognition, and the process returns to step S55.

On the other hand, when the discrimination result in step S53 is YES, step S61 obtains a minimum Tr(min) of the recognition distances Tr. Step S62 determines the rotation angle of the character from the regular position as being the rotation angle r, and the process is ended.

Figure 18A:
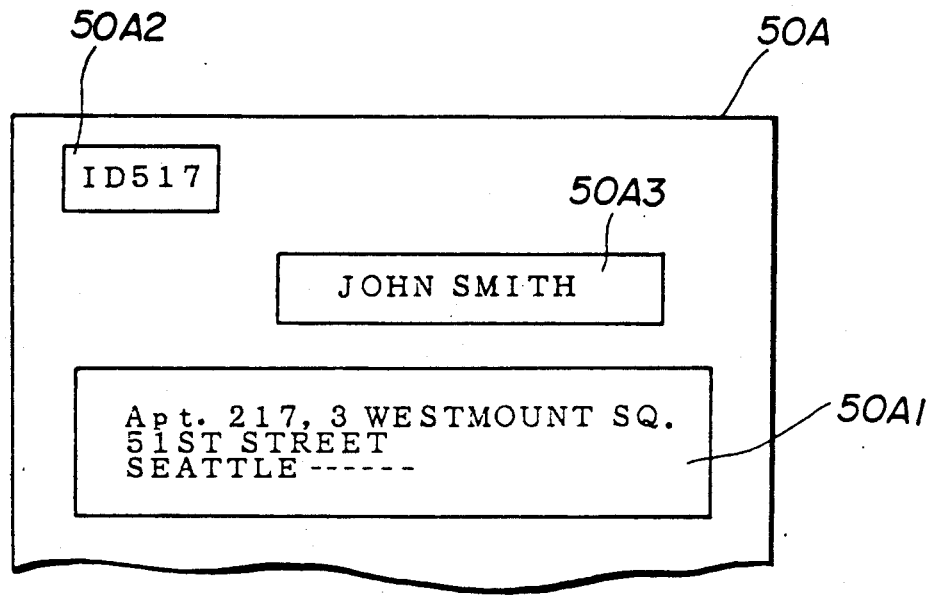
FIGS. 18A and 18B each show documents having portions written with characters in different directions.
Figure 18B:
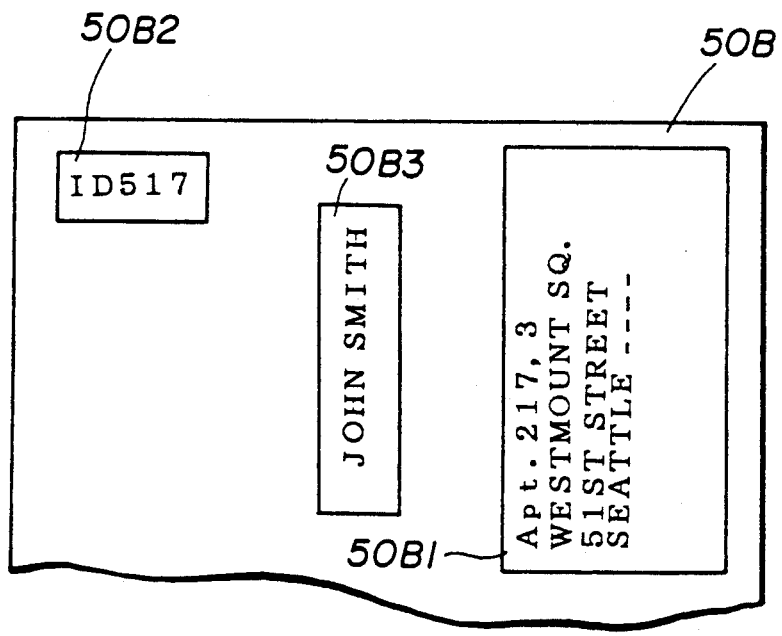

Next, a description will be given of a sixth embodiment of the character recognition method according to the present invention. This embodiment is suited for the case where a document has portions with certain attributes such as an address, a telephone number, a company name and the name of a person. This situation often occurs when reading documents which are preprinted forms containing portions where the name, address and the like are filled in. FIG. 18A shows a document 50A in which the address is written horizontally in a portion 50A1, and FIG. 18B shows a document 50B in which the address is written vertically in a portion 50B1. In FIG. 18A, the identification code and the name are respectively written horizontally in portions 50A2 and 50A3. The identification code and the name are respectively written horizontally in a portion 50B2 and vertically in a portion 50B3.

In this embodiment, the storage device 42 stores key words for each attribute. For example, when the attribute of a portion of the document is the address, this portion is likely to contain numbers, abbreviations such as "Apt." and "Bldg.", names of of cities such as "Boston", and names of states such as "N.Y." Similarly, when the attribute of another portion of the document is the telepone number, this other portion is likely to contain words such as "Tel", "Telephone", numbers including an area code and the like. Such words and numbers peculiar to each attribute are stored as key words in the storage device 42. Accordingly, in the case where the attribute of the portion of the document is the address, the assumed rotation angle of the character is likely to be correct when the character recognition results in the spelling of the word "Boston", but the assumed rotation angle may not necessarily be correct when the character recognition results in a series of numbers because the series of numbers may for example be a telephone number. In other words, the likelihood that the result of the character recognition on the assumption that the rotation angle is a certain angle may be determined based on the key words stored in the storage device 42.

Therefore, in this sixth embodiment, the rotation angle discriminator 41 successively sets in the rotation information register 15 rotation angles to which the recognition part 14 can cope with, and the character recognition is carried out in a similar manner to the fifth embodiment. Then, the primary candidate characters are supplied to the rotation angle discriminator 41 which determines the likelihood that the result of the character recognitions is correct by referring to the key words stored in the storage device 42. For example, when reading the portion 50A1 of the document 50A shown in FIG. 18A, for example, the rotation angle discriminator 41 looks up the key words stored under the attribute which is the address. The likelihood is stored in the rotation angle discriminator 41 as an evaluation value which is large when the likelihood is large. A sum of the evaluation values is obtained for each assumed rotation angle, and the rotation angle with which the sum of the evaluation values becomes a maximum is discriminated as being the actual rotation angle of the character. The rest of the operation is the same as that of the fifth embodiment.

Figure 19:
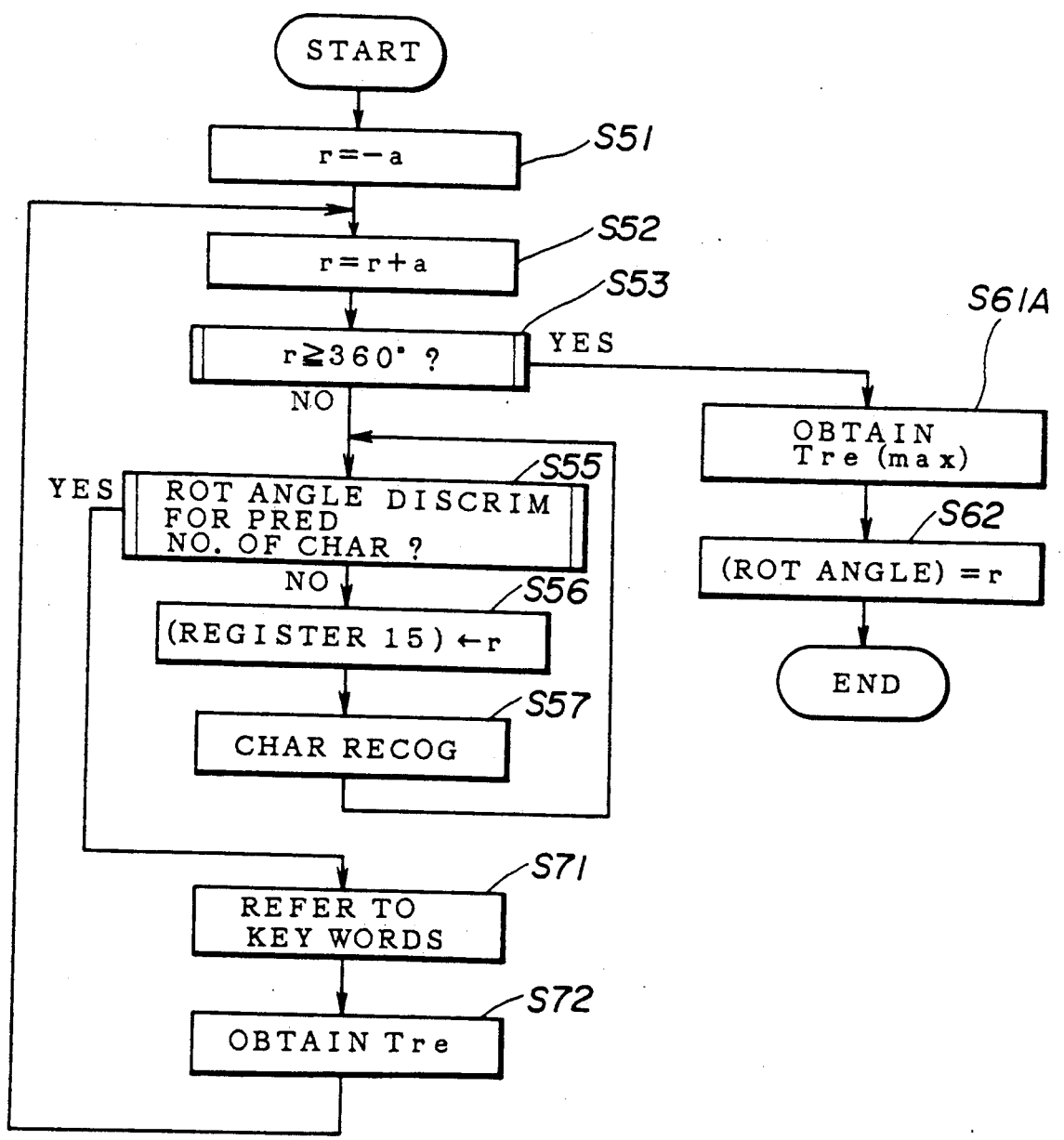
FIG. 19 is a flow chart for explaining the operation of the rotation angle discriminating part of the character recognition apparatus in a sixth embodiment of the character recognition method according to the present invention.

FIG. 19 shows a flow chart of an operation of the rotation angle discriminator 41 of the character recognition apparatus shown in FIG. 16 for use in the sixth embodiment of the character recognition method according to the present invention. In FIG. 19, those steps which are essentially the same as those corresponding steps in FIG. 17 are designated by the same reference numerals, and a description thereof is omitted. In FIG. 19, step S55 is carried out when the discrimination result in step S53 is NO. In addition, the process returns to step S55 after step S57. Furthermore, when the discrimination result in step S55 is YES, step S71 refers to the key words stored in the storage device 42, and step S72 obtains an evaluation value Tre of the likelihood that the result of the recognition is correct and the assumed rotation angle of the character is accordingly correct. The process returns to step S55 after step S72. The rest of the process is the same as that shown in FIG. 17 except that step S61A obtains a maximum evaluation value Tre(max).

Figure 20:
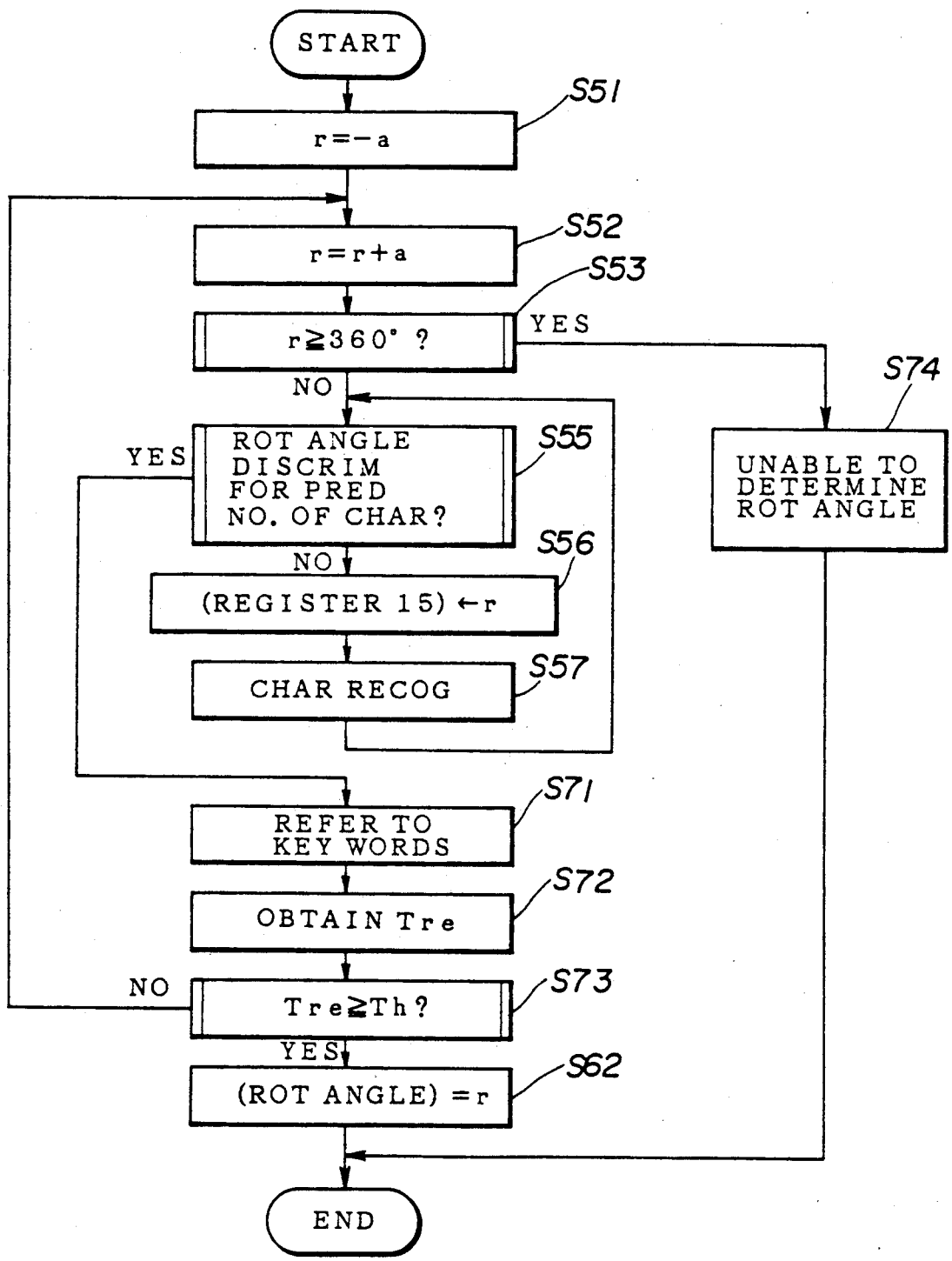
FIG. 20 is a flow chart for explaining the operation of the rotation angle discriminating part of the character recognition apparatus in a modification of the sixth embodiment of the character recognition method according to the present invention.

FIG. 20 shows a flow chart of an operation of the rotation angle discriminator 41 of the character recognition apparatus shown in FIG. 16 in a modification of the sixth embodiment of the character recognition method according to the present invention. In FIG. 20, those steps which are essentially the same as those corresponding steps in FIG. 19 are designated by the same reference numerals, and a description thereof will be omitted. In FIG. 20, step S73 is carried out after step S72. Step S73 determines whether or not the evaluation value Tre is greater than or equal to a threshold value Th. The process returns to step S52 when the result in step S73 is NO. However, step S62 is carried out and the process is ended when the result in step S73 is YES. In addition, when the result in step S53 is YES, step S74 that the rotation angle cannot be determined and the process is ended.

Next, a description will be given of a seventh embodiment of the character recognition method according to the present invention. In this embodiment, the storage device 42 stores in place of the key words, selected words which are likely to be found on the document which is read. Hence, after a certain number of characters are recognized, the rotation angle discriminator 41 refers to the words stored in the storage device 42 and recognizes whether or not a sequence of the recognized characters spell out one of the words stored in the storage device 42. In other words, the storage device 42 is used as a dictionary of words likely to be found on the document, and the evaluation value is obtained in much the same way as in the case of the sixth embodiment.

Figure 21:
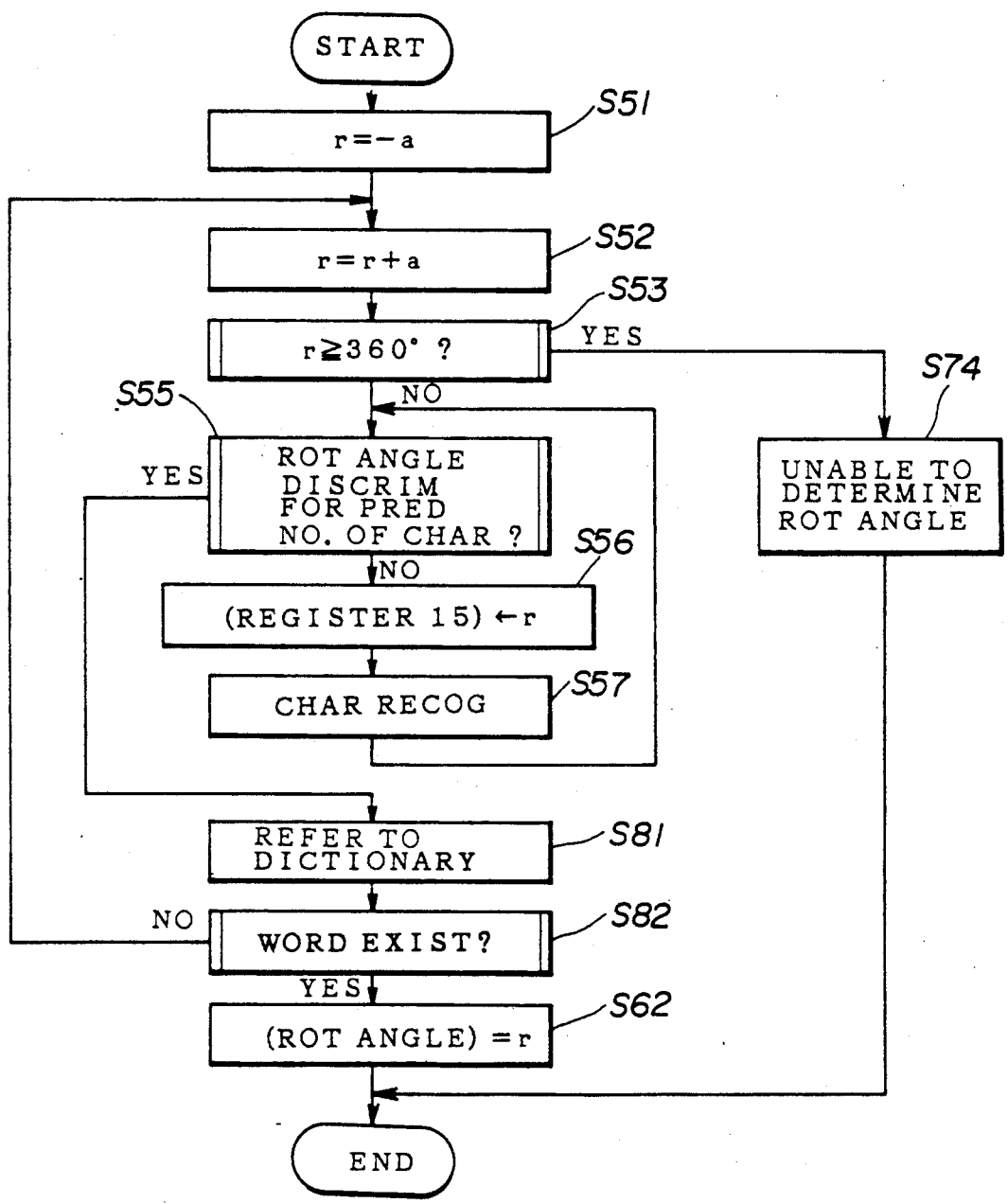
FIG. 21 is a flow chart for explaining the operation of the rotation angle discriminating part of the character recognition apparatus in a seventh embodiment of the character recognition method according to the present invention.

FIG. 21 shows a flow chart of the operation of the rotation angle discriminator 41 of the character recognition apparatus shown in FIG. 16 in the seventh embodiment of the character recognition method according to the present invention. In FIG. 21, those steps which are essentially the same as those corresponding steps in FIG. 20 are designated by the same reference numerals, and a description thereof will be omitted. In FIG. 21, step S81 refers to the dictionary in the storage device 42 when the discrimination result of step S55 is YES, and step S82 thereafter determines whether or not a series of the recognized characters spell out one of the words in the dictionary. The process returns to step S52 when the result in step S82 is NO, but the process advances to step S62 when the result in step S82 is YES.

In the fifth through seventh embodiments described heretofore, the character recognition may be made with respect to the entire document image by setting in the rotation information register 15 the rotation angle which is derived by examination a portion of the document. On the other hand, the character recognition may be made by dividing the document image into a plurality of regions and determining the rotation angle of the character in each of the divided regions. This latter method is especially effective when characters written in mutually different directions coexist on the same document.

Further, in the case of Chinese characters, one character has a meaning by itself, and for this reason, the key word used in the sixth embodiment may be constituted by a single Chinese character. Similarly, the word stored in the dictionary in the seventh embodiment may also be constituted by a single Chinese character.

Moreover, in each of the embodiments, the dictionary 21 need not necessarily store the feature quantities of characters in the regular position. That is, the feature quantities of characters rotated 180 degrees from the regular position, for example, may be stored in the dictionary. In this case, the conversion part 19 carries out a conversion to obtain the feature quantities of the characters rotated 180 degrees from the regular position. In other words, the dictionary 21 simply needs to store the feature quantities of characters in a reference position, and the conversion part 19 needs to carry out the conversion in conformance with the feature quantities stored in the dictionary 21.

Further, the present invention is not limited to these embodiments, but variations and modifications may be made without departing from the scope of the present invention.

What is claimed is

1. A character recognition method comprising steps of:

reading a document having characters displayed thereon and entering document data representative of the content of the document;

extracting image data representative of one of the characters from the document data, said one character having an orientation rotated by an arbitrary rotation angle from a predefined reference position for said one character;

extracting a first feature quantity of said one character;

converting the extracted feature quantity into a second feature quantity of said one character in the reference position based on said arbitrary rotation angle;

referring to a dictionary which contains stored feature quantities of a plurality of characters in the reference position so as to find a primary candidate character which has a feature quantity matching or most closely resembling the second feature quantity; and selecting said primary candidate character as said one character.

2. A character recognition method as claimed in claim 1 in which said step of converting the first feature quantity into the second feature quantity carries out a conversion dependent on a convention formula related to the relationship between the first feature quantity and the second feature quantity.

3. A character recognition method as claimed in claim 1 in which said step of extracting the first feature quantity includes steps of assigning direction codes to contour picture elements of said image data of said one character, each of said direction codes indicating a direction in which picture elements constituting said image data of said one character extend, and obtaining a histogram of the direction codes as said first feature quantity.

4. A character recognition method as claimed in claim 3 in which said step of converting the first feature quantity into the second feature quantity includes step of rearranging direction code components of the histogram based on said arbitrary rotation angle, said dictionary containing as the stored feature quantities histograms of the plurality of characters in the predefined reference position.

5. A character recognition method as claimed in claim 1 in which said step of extracting the first feature quantity includes steps of assigning direction codes to contour picture elements of the image data of said one character, each of said direction codes indicating a direction in which picture elements constituting the image data of said one character extend, dividing a character pattern of said one character into a plurality of regions, and obtaining a histogram of the direction codes as said first feature quantity with respect to each of the regions.

6. A character recognition method as claimed in claim 5 in which said step converting the first feature quantity into the converted feature quantity comprises step of rearranging direction code components of the histogram based on said arbitrary rotation angle with respect to each of the regions, said dictionary containing as the stored feature quantities histograms of the plurality of characters in the predefined reference position with respect to each of the regions.

7. A character recognition method as claimed in claim 1 in which said step of extracting the first feature quantity of said one character includes steps of assigning direction codes to contour picture elements of the image data of the input character in conformance with an m degree peripheral pattern, each of said direction codes indicating a direction in which picture elements constituting the image data of said one character extend, said m degree peripheral pattern describing a feature of a character in terms of distances to contour picture elements of the character along a scanning direction in each of a plurality of regions constituting a character pattern of said one character, and obtaining a histogram of the direction codes and the m degree peripheral pattern as said first feature quantity.

8. A character recognition method as claimed in claim 7 in which said step of converting the first feature quantity comprises step of rearranging direction code components of the histogram based on said arbitrary rotation angle, said dictionary containing as the stored feature quantities histograms and m degree peripheral patterns of the plurality of characters in the predefined reference position.

9. A character recognition method as claimed in claim 1 in which said arbitrary rotation angle is manually set in a register for use by said step of converting the first feature quantity into the second feature quantity.

10. A character recognition method as claimed in claim 1 in which said arbitrary rotation angle is selected from a group including 0, 90, 180 and 270 degrees counterclockwise from said predefined reference position.

11. A character recognition method as claimed in claim 1 in which said predefined reference position is a customary orientation of a character so that the character can be read in a normal manner.

12. A character recognition method as claimed in claim 1 which further comprises step of determining said arbitrary rotation angle and automatically setting said arbitrary rotation angle in a register for subsequent use by said step of converting the first feature quantity into the second feature quantity.

13. A character recognition method as claimed in claim 12 in which said step of determining said arbitrary rotation angle includes steps of carrying out a character recognition of said one character with respect to a plurality of rotation angles which are successively set in said register, and determining said array rotation angle by comparing the results of the character recognition carried out for each of the rotation angles set in said register.

14. A character recognition method as claimed in claim 12 in which said step of determining said arbitrary rotation angle includes steps of carrying out a character recognition of said one character with respect to a plurality of rotation angles which are successively set in said register, detecting differences between features of said one character and the primary candidate character from results of the character recognition carried out with respect to each of the rotation angles set in said register, and determining said arbitrary rotation angle by detecting the primary candidate character exhibiting a smallest difference.

15. A character recognition method as claimed in claim 12 in which said step of determining said arbitrary rotation angle includes steps of carrying out a character recognition of said one character with respect to a plurality of rotation angles which are successively set in said register, and determining said arbitrary rotation angle by comparing the results of the character recognition carried out for each of the rotation angles set in said register by referring to at least a key character or a key word likely to be found in the document.

16. A character recognition method as claimed in claim 12 in which said step of determining said arbitrary rotation angle includes steps of carrying out a character recognition of the input character with respect to a plurality of rotation angles which are successively set in said register, and determining said arbitrary rotation angle by comparing the results of the character recognition carried out for each of the rotation angles set in said register by referring to at least a character or word stored in a dictionary.

17. A character recognition method as claimed in claim 12 in which said step of converting the first feature quantity includes step of carrying out a conversion dependent on a conversion formula relates to the relationship between the first feature quantity and the second feature quantity.

18. A character recognition method comprising steps of:
reading an original document having characters displayed thereon;
storing document data representative of the character content of the document;
extracting image data representative of one of said characters from said document data, said one character having a first orientation;
extracting a firs feature quantity of said one character from said image data;
converting said first feature quantity into a second feature quantity based on a predetermined relationship between said first orientation and a second predefined orientation for said one character that is different from said first orientation;
referring to a dictionary which stores feature quantities of a plurality of characters in said second orientation so as to fund a primary candidate character that has a feature quantity matching or closely resembling said second feature quantity; and
selecting said primary candidate character as said one character.

19. A character recognition method as claimed in claim 18, wherein said predetermined relationship is a rotation angle indicative of the relative difference between said one character in said first and second orientations.

20. A character recognition method as claimed in claim 18, in which said step of converting the first feature quantity into the second feature quantity carries out a conversion dependent on a conversion formula related to the relationship between the first feature quantity and the second feature quantity.

21. A character recognition method as claimed in claim 18, in which said step of extracting said first feature quantity includes steps of assigning direction codes to contour picture elements of said image data of said one character, each of said direction codes indicating a direction in which picture elements constituting said image data of said one character extend, and obtaining a histogram of the direction codes as said first feature quantity.

22. A character recognition method as claimed in claim 21, in which the step of converting the first feature quantity into the second feature quantity further comprises rearranging direction code components of the histogram based on said predetermined relationship, said dictionary containing as the stored feature quantities predefined histograms of the plurality of characters in the second orientation.

23. A character recognition method as claimed in claim 18, in which said step of extracting the first feature quantity includes steps of assigning direction codes to contour picture elements of the image data of said one character, each of said direction codes indicating a direction in which picture elements constituting the image data of said one character extend, dividing a character pattern of said one character into a plurality of regions, and obtaining a histogram of the direction codes as said first feature quantity with respect to each of the regions.

24. A character recognition method as claimed in claim 23, in which said step of converting the first feature quantity further comprises rearranging direction code components of the histogram based on said predetermined relationship with respect to each of the regions, said dictionary containing as the stored feature quantities histograms of the plurality of characters in the second orientation with respect to each of the regions.

25. A character recognition method as claimed in claim 19, in which said rotation angle is manually set in a register for used by said converting step for converting the first feature quantity into the second feature quantity.

26. A character recognition method as claimed in claim 19, in which said arbitrary rotation angle is selected from a group consisting of 0, 90, 180 and 270 degrees counterclockwise from said predefined reference position.

27. A character recognition method as claimed in claim 18, which further comprises step of determining said rotation angle and automatically setting said rotation angle in a register for subsequent use in said converting step for converting the first feature quantity into the second feature quantity.

28. A character recognition method as claimed in claim 27, in which said step of determining said rotation angle includes steps of carrying out a character recognition of said one character with respect to a plurality of rotation angles which are successively set in said register, detecting differences between features of said one character and the primary candidate character from results of the character recognition carried out with respect to each of the rotation angles set in said register, and determining said rotation angle by detecting the primary candidate character exhibiting the smallest difference.

29. A character recognition method as claimed in claim 27, in which said step of determining said rotation angle includes steps of carrying out a character recognition of said one character with respect to a plurality of rotation angles which are successively set in said register, and determining said arbitrary rotation angle by comparing the results of the character recognition carried out for each of the set rotation angles by referring to at least a key character or a key word likely to be found in the document.

30. A character recognition method as claimed in claim 27, in which said step of determining said rotation angle includes steps of carrying out a character recognition of the input character with respect to a plurality of rotation angles which are successively set in said register, and determining said rotation angle by comparing the results of the character recognition carried out for each of the set rotation angles by referring to at least a character or word stored in a dictionary.

* * * * *